United States Patent
Kim et al.

(10) Patent No.: US 8,498,513 B2
(45) Date of Patent: Jul. 30, 2013

(54) METHOD OF CONTROLLING DEVICES AND TUNER DEVICE

(75) Inventors: Taek Soo Kim, Seoul (KR); Chi Ho Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 866 days.

(21) Appl. No.: 12/654,687

(22) Filed: Dec. 29, 2009

(65) Prior Publication Data

US 2010/0319037 A1  Dec. 16, 2010

Related U.S. Application Data

(60) Provisional application No. 61/187,282, filed on Jun. 16, 2009.

(30) Foreign Application Priority Data

Sep. 18, 2009 (KR) .................. 10-2009-0088698

(51) Int. Cl.
| | |
|---|---|
| *H04N 5/765* | (2006.01) |
| *H04N 5/92* | (2006.01) |
| *H04N 5/93* | (2006.01) |
| *H04L 12/26* | (2006.01) |

(52) U.S. Cl.
USPC .................. 386/200; 386/239; 370/252

(58) Field of Classification Search
None
See application file for complete search history.

(56) References Cited

U.S. PATENT DOCUMENTS

| | | | |
|---|---|---|---|
| 6,801,939 B1 | 10/2004 | Chafe | |
| 7,408,883 B2 * | 8/2008 | Deragon et al. | 370/249 |
| 2004/0063454 A1 | 4/2004 | Sasaki | |
| 2004/0088434 A1 | 5/2004 | Takabatake | |
| 2005/0148314 A1 | 7/2005 | Taglienti et al. | |
| 2005/0182501 A1 | 8/2005 | Franchuk et al. | |

(Continued)

FOREIGN PATENT DOCUMENTS

| | | |
|---|---|---|
| EP | 1596559 | 11/2005 |
| JP | 2008-219311 A | 9/2008 |

(Continued)

OTHER PUBLICATIONS

Mohan et al. "Drive test based EDGE Radio Network Performance Evaluation", Vehicular technology Conference, 2005. IEEE, vol. 3, Sep. 25, 2005, pp. 1658-1661, XP010878726.

(Continued)

*Primary Examiner* — William C Vaughn, Jr.
*Assistant Examiner* — Heather Jones
(74) *Attorney, Agent, or Firm* — McKenna, Long & Aldridge, LLP.

(57) ABSTRACT

A control method for recording audio/video data streams in a display device of a wireless network comprises transmitting a Give Tuner Device Status message to a tuner device to request status information of the tuner device that senses a record command signal input from a user and transmits A/V data streams to the display device; receiving a response message, Tuner Device Status message, which includes the status information of the tuner device, from the tuner device in response to the Give Tuner Device Status message; transmitting a record on message, which includes the status information of the tuner device, to the source device; and receiving a record status message from the source device in response to the record on message, wherein the response message includes information indicating whether caption information is included in the A/V data streams transmitted from the tuner device to the display device.

28 Claims, 27 Drawing Sheets

U.S. PATENT DOCUMENTS

| | | |
|---|---|---|
| 2005/0254524 A1 | 11/2005 | An |
| 2006/0174304 A1 | 8/2006 | Kim et al. |
| 2007/0109961 A1 | 5/2007 | Liang |
| 2008/0031136 A1 | 2/2008 | Gavette et al. |
| 2008/0049633 A1 | 2/2008 | Edwards et al. |
| 2008/0056154 A1 | 3/2008 | Firestone et al. |
| 2008/0068152 A1 | 3/2008 | Igoe |
| 2008/0101253 A1 | 5/2008 | Shvodian |
| 2008/0134005 A1 | 6/2008 | Izzat et al. |
| 2008/0144553 A1* | 6/2008 | Shao et al. .................... 370/310 |
| 2008/0220767 A1 | 9/2008 | Aretz et al. |
| 2008/0244679 A1 | 10/2008 | Sukumar et al. |
| 2008/0320539 A1 | 12/2008 | Ohkita |
| 2009/0010233 A1 | 1/2009 | Pratt et al. |
| 2009/0051765 A1 | 2/2009 | Moberly |
| 2009/0054033 A1 | 2/2009 | Pratt et al. |
| 2009/0225669 A1 | 9/2009 | Qin et al. |
| 2009/0241147 A1 | 9/2009 | Kim et al. |
| 2009/0271530 A1 | 10/2009 | Ohkita |
| 2009/0310574 A1* | 12/2009 | Jeon et al. ..................... 370/336 |
| 2009/0327572 A1 | 12/2009 | Cho et al. |
| 2010/0020770 A1 | 1/2010 | Qin et al. |

FOREIGN PATENT DOCUMENTS

| | | |
|---|---|---|
| KR | 10-0782837 B1 | 12/2007 |
| KR | 10-0846800 | 7/2008 |
| KR | 10-2009-0057946 | 6/2009 |
| WO | WO 01/58162 | 8/2001 |
| WO | WO 2008/072910 | 6/2008 |

OTHER PUBLICATIONS

Christian Huitema: "Routing in the Internet, the Internet Protocol", Jan. 1, 2000, pp. 38-39, XP002600850.

* cited by examiner

In Blocks : B0, B1, B2, B3, B4, ...
Out Blocks : B0, B16, B32, B48, B64, ..., B1, B17, B33, B49, B65, ... , B2, B18, B34, B50, B66, ...

Figure 13

| Block Processing | Block Type | Quantization | Rate Adjustment |
|---|---|---|---|
| 1 bit | 1 bit | $N_{bits\_per\_block}$ bits | 0 - 1 bits |

| Size | 2 bytes | 2 bytes | 1 byte | 1-254 bytes | 2 bytes |
|------|---------|---------|--------|-------------|---------|
|  | Message Preamble | Type | Length | message Body | MCS |

METHOD OF CONTROLLING DEVICES AND TUNER DEVICE

This application claims the benefit of the U.S. provisional patent application No. 61/187,282 filed on Jun. 16, 2009, and the Korean Patent Application No. 10-2009-0088698, filed on Sep. 18, 2009, which are hereby incorporated by reference as if fully set forth herein.

BACKGROUND OF THE INVENTION

1. Field of the Invention

The present invention relates to a method of controlling devices and a tuner device, and more particularly, to a method of exchanging messages between devices in a wireless network, and a sink device for the same.

2. Discussion of the Related Art

Recently, with the development of communication, computer, and network technologies, many kinds of networks have been developed and used for actual life. Examples of the network include a large-scaled network, such as wire or wireless Internet, which connects the whole world, and a small-scaled wire or wireless network that connects home appliances with one another within a limited place such as general homes or companies. With a variety of network types, various interfacing technologies that allow communication between networks or between devices by connecting them with each other have been developed.

FIG. 1 is a brief diagram illustrating an example of a wireless video access network (WVAN) which is a kind of a wireless private access network (WPAN).

The WVAN is a wireless network that can support uncompressed transmission of 1080P A/V streams by configuring wireless networks between digital devices within a limited space of 10 m or less such as home to obtain throughput of 4.5 Gbps or greater with a bandwidth of about 7 GHz. In this respect, the WVAN is a network configured between personal devices within a limited space. In this way, by configuring a network through direct communication between devices, information can be exchanged between applications without seamlessness.

Referring to FIG. 1, the WPAN includes two or more user devices 11 to 15, one of which acts as a coordinator 11. The coordinator 11 provides basic timing of the WPAN and serves to control quality of service (QoS) requirements. Examples of the user devices include computers, PDAs, notebook computers, digital TVs, camcorders, digital cameras, printers, mikes, speakers, headsets, bar-code readers, displays, and cellular phones. All digital devices can be used as the user devices.

A high-capacity video bus uses a high-speed digital signal transmission mode of 1 Gbps or greater to transmit audio data of HD screen of 1080p or greater and high quality. However, since such a high-capacity video bus is transmitted through a specific cable connected between devices, a demand of a user who desires to transmit data of a high-speed A/V bus in real-time and a wireless mode is being increased. In case of data transmission of a high-speed A/V bus in a wireless mode, it is advantageous in that the number of cables can be reduced and there is no distance limitation between devices. However, in case of WLAN (IEEE802.11), since A/V signal and other data are all processed as general data by a physical layer system, there is difficulty in transmitting data of a high-speed A/V bus in a wireless mode.

SUMMARY OF THE INVENTION

In a wireless video access network (WVAN) which is a kind of a wireless private access network (WPAN), since A/V signal and other data are all processed as general data by a physical layer system, there is difficulty in transmitting data of a high-speed A/V bus in a wireless mode. In this respect, A/V signal transmission is recently performed using a wireless home digital interface (WHDI) network.

In order to perform a predetermined function of a device between devices belonging to a WHDI network, a response message to AVCL message request can be exchanged between a transmitting device and a receiving device, and status information of a sub device of the transmitting device can also be exchanged through the AVCL message. In this case, a problem occurs in that status information of the sub device included in the transmitting device is not exactly transferred to the receiving device through the AVCL message exchange, whereby a user fails to identify the status information of the sub device. Accordingly, the present invention has been devised to substantially obviate one or more problems due to limitations and disadvantages of the related art. An object of the present invention is to provide a user with caption information indicating processing matters of an AVCL request message by transferring caption processing information of a tuner device included in a transmitting device to a display sub device attached to a receiving device when the tuner device transmits a response message to the AVCL request message.

It is to be understood that technical problems to be solved by the present invention are not limited to the aforementioned technical problems and other technical problems which are not mentioned will be apparent from the following description to the person with an ordinary skill in the art to which the present invention pertains.

To achieve these objects and other advantages and in accordance with the purpose of the invention, as embodied and broadly described herein, according to a first aspect of the present invention, a method for controlling recording of an audio/video (A/V) data stream in a display device of a wireless network comprises transmitting a first request message to a tuner device for requesting status information of the tuner device that transmits an A/V data stream to the display device after receiving a recording instruction signal from a user; receiving a first response message which comprises status information of the tuner device, from the tuner device in response to the first request message; transmitting a second request message to request recording of the A/V data stream to the source device, the second request message comprising the status information of the tuner device; and receiving a second response message from the source device in response to the second request message, wherein the first response message comprises information indicating whether caption information is included in the A/V data stream transmitted from the tuner device to the display device.

The method further comprises transmitting a test message to the tuner device for testing whether the tuner device processes the first request message; and receiving a third response message from the tuner device in response to the test message.

The display device displays a caption included in the caption information by overlaying it on the A/V data, and the caption is text data indicating the status of the tuner device.

The first response message further comprises information indicating whether the tuner device is performing recording on a specific channel.

The first request message is transmitted to the tuner device by being encapsulated in a first uplink control PHY data unit (ULCPDU), and wherein the first response message is received in the display device by being encapsulated in a first downlink PHY data unit (DLPDU).

The first DLPDU comprises a basic header and an extended header, and wherein the first response message is included in the extended header or the first response message is included in the first DLPDU by being multiplexed with A/V signals transmitted from the tuner device.

The first DLPDU is transmitted for a time period that comprises a first time period for which a MAC message and at least one header are transmitted and a second time period for which the A/V signals are transmitted, and the first ULCPDU is transmitted for the first time period.

The second request message is transmitted to the source device by being encapsulated in a second ULCPDU, and the second response message is received in the display device by being encapsulated in a second DLPDU.

The second DLPDU comprising a basic header and an extended header, and the second response message is included in the extended header or the second response message is included in the second DLPDU by being multiplexed with A/V signals transmitted from the source device.

The second DLPDU is transmitted for a time period that includes a first time period for which a MAC message and at least one header are transmitted and a second time period for which the A/V signals are transmitted, and the second ULCPDU is transmitted for the first time period.

To achieve these objects and other advantages and in accordance with the purpose of the invention, as embodied and broadly described herein, according to a second aspect of the present invention, a sink device performing control for recording of an audio/video (A/V) data stream in a wireless network, the sink device comprising an audio video control (AVC) layer generating a first command comprising a first identifier identifying the sink device, a second identifier identifying a source device or a tuner device, and an operation code; a medium access control (MAC) layer generating a MAC message comprising a message preamble, a message type and the first command transferred from the AVC layer; and a physical layer generating a first physical data unit comprising an uplink control header, the MAC message and A/V data and transmitting the first physical data unit to the source device or the tuner device, and receiving a second physical data unit from the source device or the tuner device, the second physical data unit comprising a second command transmitted from the source device or the tuner device in response to the first command, wherein the second command comprises information indicating whether caption information is included in an A/V data stream transmitted from the tuner device to a display device.

The first command comprises a first request message for requesting status information of the tuner device, and wherein the second command comprises a first response message indicating the status of the tuner device.

The first command comprises a second request message for requesting recording of the A/V data stream, and wherein the second command comprises a second response message in response to the second request message.

The first physical data unit is an uplink control physical data unit (ULCPDU), and wherein the second physical data unit is a downlink physical data unit (DLPDU).

The first command comprises a test message testing whether the source device or the tuner device processes AVCL command transmitted from the sink device, and wherein the second command comprises a third response message in response to the test message.

The DLPDU is transmitted for a time period comprising a first time period for which the MAC message and at least one header are transmitted and a second time period for which the A/V data are transmitted, and wherein the ULCPDU is transmitted for the first time period for which a part of the DLPDU should be transmitted.

The second command is multiplexed with the A/V signals transmitted from the tuner device or the source device and then included in the DLPDU.

The DLPDU includes a basic header and an extended header, and wherein the second command is included in the extended header.

To achieve these objects and other advantages and in accordance with the purpose of the invention, as embodied and broadly described herein, according to a third aspect of the present invention, a source device of a wireless network, the source device comprising a receiving module receiving a broadcasting signal and a first command from a sink device, the first command for identifying whether the source device can record audio/video (A/V) data; a network control module processing the first command and generating a physical data unit comprising a MAC message and the broadcasting signal, the MAC message comprising a second command in response to the first command, and transmitting the generated physical data unit to the sink device; and a control module determining whether to perform control recording of an A/V data stream according to the first command processed by the network control module, wherein the control module determines whether to record the A/V data stream depending on the status of a tuner device.

To achieve these objects and other advantages and in accordance with the purpose of the invention, as embodied and broadly described herein, according to a fourth aspect of the present invention, a method of exchanging messages in a tuner device receiving a first command from a display device of a wireless network, the method comprising generating a second command comprising information indicating the status of the tuner device in response to the first command in an AVC layer; transferring a MAC message from a MAC layer to a physical layer, the MAC message comprising a message preamble, a message type and the second command transmitted from the AVC layer; and transmitting a downlink physical (PHY) layer data unit from the physical layer to the display device, the physical data unit comprising at least one header, the MAC message, and the A/V data, wherein the second command comprises information indicating whether caption information is included in an A/V data stream transmitted from the tuner device to the display device.

The method further comprises generating a response message to a test message for testing whether the AVC layer processes a specific AVCL command transmitted from the sink device.

A caption included in the caption information is text data indicating the status of the tuner device.

The second command further comprises information indicating whether the tuner device is performing recording on a specific channel.

To achieve these objects and other advantages and in accordance with the purpose of the invention, as embodied and broadly described herein, according to a fifth aspect of the present invention, a tuner device in a wireless network, the tuner device comprising an AVC layer generating an AVCL message comprising a first identifier identifying the tuner device, a second identifier identifying a display device, a second command comprising an operation code, and information of the tuner device, wherein the AVCL message is a response message for a first command received from the display device; a MAC layer generating a MAC message comprising a message preamble, a message type and the second command transferred from the AVC layer; and a physical layer receiving a first physical data unit comprising the first command, and generating a second physical data unit comprising an uplink control header, the MAC message and Audio/Video (A/V) data and transmitting the second physical data unit to the display device, wherein the information of the tuner device comprises information indicating whether caption information is included in an A/V data stream transmitted from the tuner device to the display device.

A caption included in the caption information is text data indicating the status of the tuner device.

The first physical data unit is an uplink control physical data unit (ULCPDU), and wherein the second physical data unit is a downlink physical data unit (DLPDU).

The DLPDU includes a basic header and an extended header, and the second command is included in the extended header or the second command is included in the DLPDU by being multiplexed with A/V signals transmitted from the tuner device.

The DLPDU is transmitted for a time period comprising a first time period for which the MAC message and at least one header are transmitted and a second time period for which the A/V signals are transmitted, and wherein the ULCPDU is transmitted for the first time period.

The present invention is intended to provide a method of transferring status information of a tuner device included in a transmitting device and caption processing information displaying the status information to a receiving device when the receiving device requests the status information of the tuner device to perform a specific function. In this case, a user of the receiving device can identify the status information of the tuner device through caption, whereby the user can use a WHDI device more conveniently.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

FIG. 13 is a diagram illustrating quantization bits produced for each video block in a DLPDU PHY structure of a WHDI active source device;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

To solve the aforementioned technical problems, the embodiments of the present invention disclose a method of performing a performance test of a wireless routing path for A/V signal transmission in a wireless home digital interference (WHDI) network.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

A wireless home digital interface (WHDI) system which is recently being studied is to transmit uncompressed audio and vide (A/V) data at a 5 Ghz U-NII bandwidth. In the WHDI system, a PHY layer is responsible for the tasks to process and modulate A/V data considering a human audio-visual characteristic, whereby high-capacity video bus data are converted to wireless data more efficiently.

At least one user device included in the WHDI system includes a source device transmitting A/V signals and a sink device receiving the A/V signals from the source device. In this case, the source device that actually transmits A/V signals will be regarded as an active source device, and the sink device that receives Audio/Video signals does not actually transmit the A/V signals and includes a passive source device additionally connected with an active source device. Each of the devices can be divided into at least three layers depending on its functions. Generally, each of the devices includes a PHY layer, a media access control (MAC) layer, and an AVC layer.

Figure 2:
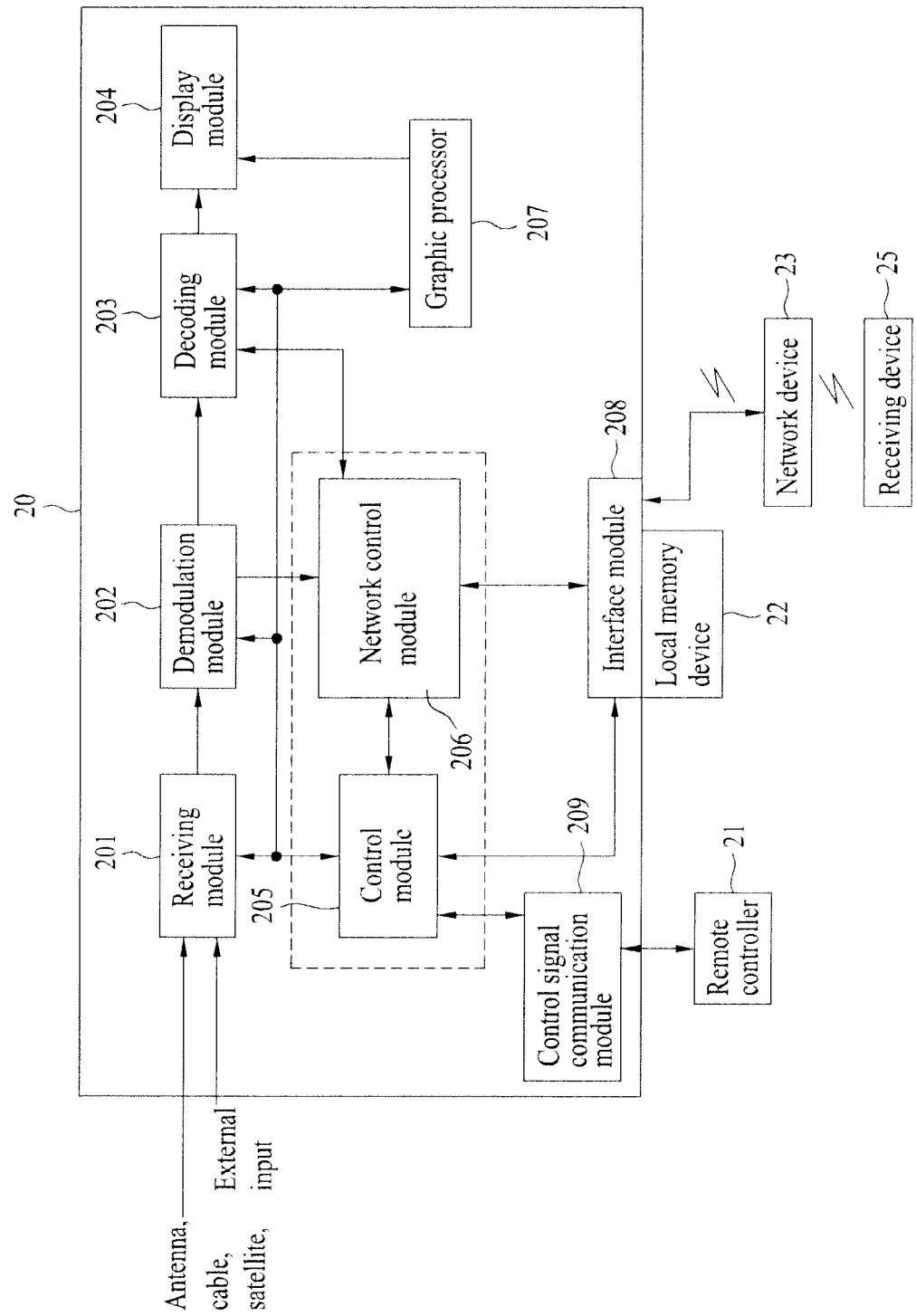
FIG. 2 is a diagram illustrating an embodiment of a broadcasting signal processing system that includes a broadcasting signal receiver as an example of a transmitting device in a wireless home digital interface (WHDI) system.

FIG. 2 is a diagram illustrating an embodiment of a broadcasting signal processing system that includes a broadcasting signal receiver as an example of a transmitting device in a wireless home digital interface (WHDI) network.

The broadcasting signal receiver can play A/V signals (hereinafter, referred to as A/V data received through processes which will be described layer) input from a broadcasting station or a cable satellite through an antenna. Also, when the broadcasting signal receiver acts as a transmitting device on the WHDI network, it can remotely transmit the received A/V signals to at least one receiving device.

Referring to FIG. 2, the broadcasting signal processing system which is an example of the transmitting device includes a broadcasting signal receiver 20 and a network device 23 that connects the broadcasting signal receiver with a remote memory device or other device 25.

The broadcasting signal receiver 20 includes a receiving module 201, a demodulation module 202, a decoding module 203, a display module 204, a control module 205, a network control module 206, a graphic processor 207, an interface module 208, and a control signal communication module 209. In the example of FIG. 2, the broadcasting signal receiver 20 further includes a local memory device 22 directly connected with the interface module 208 that includes input and output ports. However, the local memory device may be a memory device mounted in the broadcasting signal receiver 20.

The interface module 208 can communicate with the wire/wireless network device 23, and can be connected with at least one receiving device 25 through the network device 23, wherein the at least one receiving device 25 exists on the wireless network. The control signal communication module 209 receives a user control signal in accordance with a user control device, for example, remote controller 21, and outputs the received signal to the control module 205.

The receiving module 201 could be a tuner that receives a broadcasting signal of a specific frequency through at least one of ground wave, satellite, cable, and Internet network. The receiving module 201 may be provided respectively for each of broadcasting sources, for example, ground wave broadcasting, cable broadcasting, satellite broadcasting, and personal broadcasting. Alternatively, the receiving module 201 may be a unified tuner. Also, supposing that the receiving module 201 is a tuner for ground wave broadcasting, at least one digital tuner and at least one analog tuner may be provided respectively, or a digital/analog tuner may be provided.

Furthermore, the receiving module 201 may receive internet protocol (IP) streams transferred through wire and wireless communication. If the receiving module 201 receives IP streams, the receiving module 201 can process transmitting and receiving packets in accordance with an IP protocol that establishes source and destination information for received IP packets and packets transmitted from the broadcasting signal receiver. The receiving module 201 can output video/audio/data streams included in the received IP packets in accordance with the IP protocol, and can generate transport streams to be transmitted to the network as IP packets in accordance with the IP protocol to output them. The receiving module 201 is an element that receives an externally input video signal, and, for example, may receive IEEE 1394 type video/audio signals or HDMI type streams from the outside.

The demodulation module 202 demodulates the input broadcasting signals in an inverse order of a modulation mode. The demodulation module 202 outputs broadcasting streams by demodulating the broadcasting signals. If the receiving module 201 receives stream type signals, for example, IP streams, the IP streams are output to the decoding module 203 after passing the demodulation module 202.

The decoding module 203 includes an audio decoder and a video decoder, and decodes the broadcasting streams output from the demodulation module 202 or streams produced through the network control module 206 through their respective algorithms and outputs the decoded streams to the display module 204. At this time, a demultiplexer (not shown) that splits each stream in accordance with a corresponding identifier may additionally be provided between the demodulation module 202 and the decoding module 203. The demultiplexer splits the broadcasting signals into an audio element stream (ES) and a video element stream and outputs them to each decoder of the decoding module 203. Also, if a plurality of programs are multiplexed in one channel, the demultiplexer selects only a broadcasting signal of a program selected by a user and splits the selected broadcasting signal into a video element stream and an audio element stream. If data streams or system information streams are included in the demodulated broadcasting signals, they are split by the demultiplexer and then transferred to a corresponding decoding block (not shown).

The graphic processor 207 processes a graphic to be displayed so that a menu screen is displayed in a video image displayed by the display module 204, and controls the graphic to be displayed in the display module 204 together with the menu screen.

The interface module 208 can be interfaced with at least one receiving device 25 through a wire and wireless network. Examples of the interface module 208 include Ethernet module, Bluetooth module, short distance wireless Internet module, portable Internet module, home PNA module, IEEE1394 module, PLC module, home RF module, and IrDA module. Meanwhile, the interface module 208 can output a control signal to a remote memory device, wherein the control signal can turn on the power. For example, although not shown in FIG. 2, the interface module 208 can turn on the power of a separate remote memory device by transmitting a WOL signal to a network interface module that performs communication with the remote memory device.

The network control module 206 is operated to transmit the broadcasting signals received by the receiving module 201 together with MAC message through a physical data unit when the broadcasting signal receiver 20 illustrated in FIG. 2 transmits the broadcasting signals received therein to another device on the WHDI network. The network control module 206 may directly receive the broadcasting signals from the receiving module 201, or may receive the broadcasting signals demodulated by the demodulation module 202. In case of the former case, an encoding process may be omitted. Also, the broadcasting signals received by the receiving module 201 can be input to the protocol layer module 206 after going through a processing procedure for signal transmission in the control module 205. For example, if a message including the broadcasting signals is received from the receiving device 25, the received message is split into a broadcasting signal and MAC message by the network control module 206. The split broadcasting signal (or broadcasting stream) is input to the decoding module 203, decoded by a decoding algorithm, and output to the display module 204.

The network control module 206 may be regarded as a second control module different from the control module 205, wherein the second control module controls an AVC layer generating a predetermined audio video control layer (AVCL) command, a MAC layer generating MAC message including the AVCL command transferred from the AVC layer, and a PHY layer generating a first physical data unit including the broadcasting signals input from the receiving module 201 or the demodulation module 202 and the MAC message. The first physical data unit can be transmitted to another device using the network device 24 through the interface module 208. Also, the network control module 206 can receive a second physical data unit including a response message transmitted from the receiving device which has received the AVCL command, wherein the response message is transmitted in response to the AVCL command.

Although the control module 205 and the network control module 206 are provided separately in FIG. 2, these control modules can be implemented by one system chip as illustrated in a dotted part. Specifically, in the protocol layer that includes the AVC layer, the MAC layer and the PHY layer, which are controlled by the network control module 206, the AVC layer and the MAC layer can identify a message to be transmitted or received within the control module 205. At this time, the PHY layer forms a physical data block in the network control module 206. The network control module 206 will be described in detail with reference to a structure of the physical data block illustrated in FIG. 9 to FIG. 16.

The control module 205 can control the operations of the aforementioned modules (receiving module, demodulation module, decoding module, display module, graphic processor, network control module, and interface module). Also, the control module 205 displays a menu that receives a control command of the user, and drives an application that displays various kinds of information or menu of a broadcasting signal processing system for the user.

For example, the control module 205 can read out contents stored in the local memory device 22 if the local memory device 22 is mounted in the broadcasting signal receiver. Also, the control module 205 can control the operation of the local memory device 22 so that the broadcasting contents received from the receiving module 201 are stored in the local memory device 22 if the local memory device 22 is mounted in the broadcasting signal receiver. Furthermore, the control module 205 can output a control signal for mounting the local memory device 22 depending on whether the local memory device 22 has been mounted in the broadcasting signal receiver.

The control module 205 checks remaining memory capacity of the local memory device 22, and allows information of the remaining memory capacity to be displayed for the user on the display module 204 through the graphic processor 207. The control module 205 can shift the contents stored in the local memory device 22 to the remote memory device if the remaining memory capacity of the local memory device 22 is not sufficient. In this case, the control module 205 can display a menu indicating whether to shift the contents stored in the local memory device to another local memory device (not shown) or the remote memory device through the display module 204. And, the control module 205 can receive and process a user control signal of the menu. Accordingly, the control module 205 can allow the contents stored in the local memory device 22 and other directly or remotely mounted memory device to be shifted between them and stored therein.

Also, the control module 205 can record and display A/V data received all at once or process a recording of A/V data received through a specific channel. The display module 204 displays the broadcasting contents received from the receiving module 201 and the contents stored in the local memory device 22. The control module 204 can display a menu indicating whether the memory device has been mounted in the broadcasting signal receiver and information related to the remaining capacity of the memory device, in accordance with a control command of the control module 205, and can be operated under the control of the user.

According to one embodiment of the present invention, the transmitting device illustrated in FIG. 2 can be combined with at least one sub device. Although not shown in FIG. 2, the transmitting device is an example of the sub device, and may have an internal tuner device or may be combined with an external tuner device, wherein the internal tuner device synchronizes with a frequency of an electrical signal or a certain electric wave to selectively display the corresponding electric wave only. Hereinafter, the sub device will be described later with reference to FIG. 26.

Figure 3:
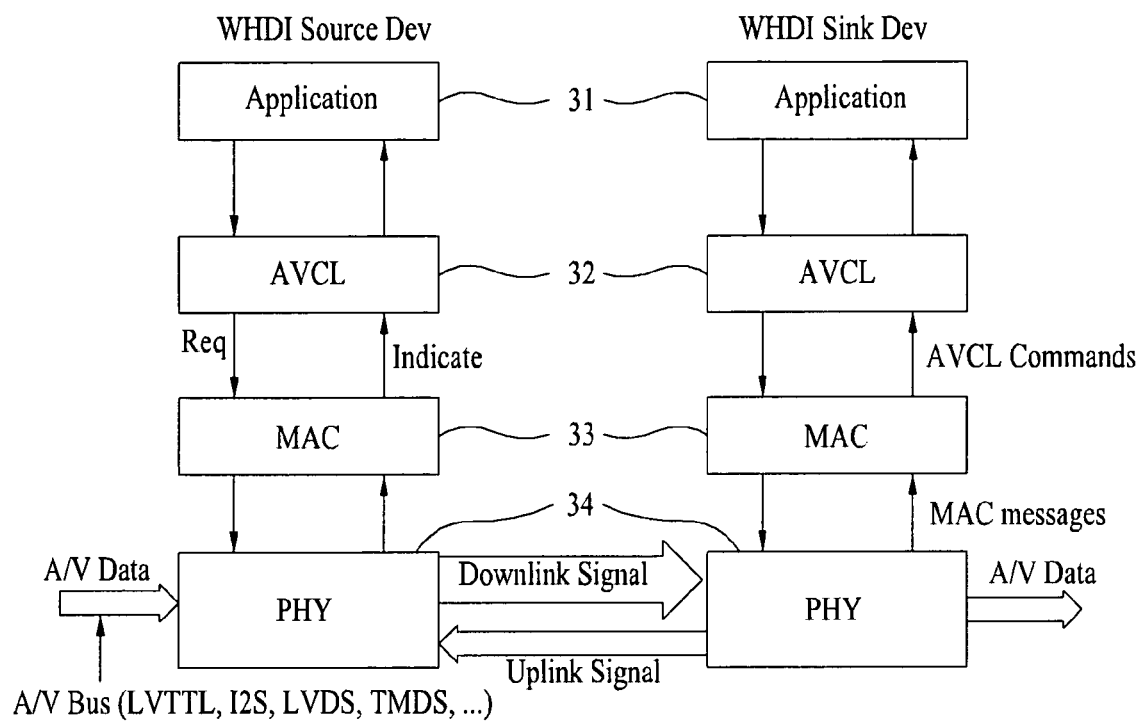
FIG. 3 is a diagram illustrating an example of a protocol layer structure implemented in a device of a WHDI system.

FIG. 3 is a diagram illustrating an example of a protocol layer structure implemented in a device of a WHDI system.

The protocol layer structure is implemented in the network control module 206 of FIG. 2.

Referring to FIG. 3, the WHDI system includes four layers.

An application layer 31 which is the uppermost layer is to allow the user to unify WHDI in a host system of the user.

An audio video control layer (AVCL) 32 is an upper layer that takes the role in device control and streaming connection for A/V data transmission between the source device and the sink device. The AVCL is used to allow the sink device to indicate an active source device that desires to receive A/V streams from a specific source device. The sink device may receive and render A/V streams, or may not need to receive A/V streams any more. Meanwhile, in the source device, the AVCL is used to indicate a specific display requested by the user to display contents on the display module of the source device. Also, the AVCL is used to allow the source device to determine receptive capacity related to A/V data of the sink device or transfer meta data related to A/V data. Moreover, the AVCL is used to allow all devices to perform remote device control (RDC) such as play of a display player or control of channel change on a set-top box.

As described above, the AVCL includes two types of control modes of control protocol and meta data transfer. In this case, the control protocol (or AVCL protocol) includes bidirectional command transmission between devices on an active network. Generally, the message including the AVCL command goes through the MAC layer, is mapped with the MAC message, and is transmitted together with other data in the PHY layer. This will be described later.

Next, a media access control (MAC) layer 33 takes the role in link setup, connection or non-connection, and channel access to a lower layer of a material transmission protocol, and also takes the role in reliable data transmission. In other words, the MAC layer 33 serves to transmit a control/data message or control a channel.

The MAC layer implements subcarrier sense or clear channel assessment (CCA) before transmitting packets using carrier sense multiple access with collision avoidance (CSMA/CA) based on ACK frame as a basic channel access scheme. Considering directionality between the source device and the sink device, the MAC layer is divided into a downlink and an uplink. The downlink is implemented by one long frame, and a recovery process using ACK frame can be skipped in the downlink. Since synchronization between a video frame which is transmitted and a modem (PHY) frame is performed in the downlink, a required transmission time is determined in accordance with a format of A/V signals which are transmitted. Generally, a MAC format includes a basic header (BH) and an extended header (EH).

Next, a PHY layer 34 directly processes A/V data and at the same time the A/V data may be processed by the MAC layer 33. In the WHDI, the PHY layer is responsible for the tasks to send and receive the audio and video data which are sampled in the raw. The PHY layer also takes the role to convert the message requested from the upper layers such as the AVCL layer 32 and the MAC layer 33 to the corresponding radio signal, so that the messages can be sent and received between devices by the PHY layer. Also, the PHY Layer has the features including the capability of unidirectional transmission for A/V data and the capability of bidirectional data channel. Moreover, the PHY layer has the features including PHY level encryption of all A/V data and measurement capability for SNR, carrier sense and interference detection.

The PHY Layer accepts/outputs raw video samples in the form of 4:4:4 YCbCr stream of pixels, on the source/sink devices, respectively. The PHY Layer also accepts/outputs raw audio samples in a number of formats, on the source/sink devices, respectively. All conversions into/from these formats are done at the application layer 31 in the source/sink devices, respectively.

The protocol layer of the WHDI device shown in FIG. 2 can also be applied to the tuner device, and is equally implemented during message exchange between the tuner device and the sink device. In other words, even in the case that the tuner device receives AVCL command from the sink device or transmits a response message to the received AVCL command, the AVCL layer generates AVCL message, the MAC layer generates MAC message combined with the AVCL message and preamble, and the physical layer exchanges the AVCL message with the MAC message.

Figure 4:
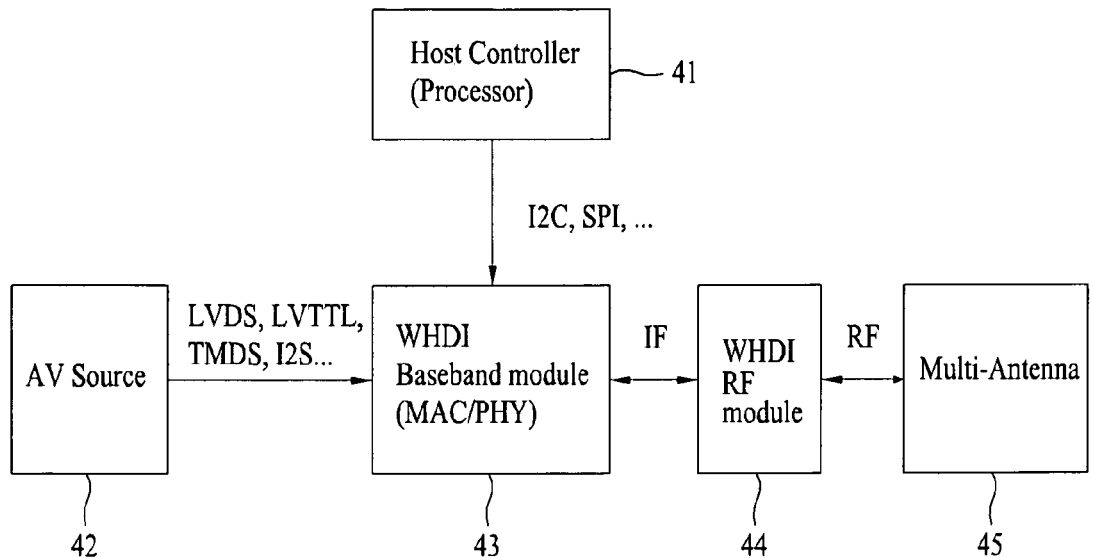
FIG. 4 is a block diagram illustrating an example of a source device in a WHDI system.

FIG. 4 is a block diagram illustrating an example of a source device in a WHDI system.

Referring to FIG. 4, a host controller 41 which is a kind of a processor unifies and manages the whole system, and takes the role to perform the functions of the AVCL or control a WHDI baseband module 43 using an I2C (inter integrated circuit) bus system structure. Since the I2C bus system is operated on an I2C protocol, a plurality of ICs can be connected or communicated with one another through a common bus. The I2C bus system is widely used in a consumer electronic device to provide a method of connecting a central processing unit (CPU) with related peripheral ICs in a television environment (i.e., providing communication between the CPU and the peripheral ICs). The I2C system is generally limited to transmit data at a setting clock speed in accordance with a setting protocol, and a main control IC of the I2C system sets a transmission rate or speed (i.e., clock rate or bus speed). Accordingly, all ICs connected with a specific I2C bus should be communicated at the same speed or data transmission rate. The host controller 41 may include a memory therein, or may use an external memory.

The WHDI baseband module 43 takes the role as the aforementioned MAC/PHY layer, and transmits A/V data to a WHDI RF module 44 at an intermediate frequency (IF) by receiving the A/V data from an A/V source device 42 through a bus such as LVDS. The WHDI RF module 44 converts the intermediate frequency (IF) to a carrier signal and transmits the converted microwave signal through a multi-antenna 45. The WHDI RF module 44 can transmit and receive a control signal in addition to the A/V data.

Figure 5:
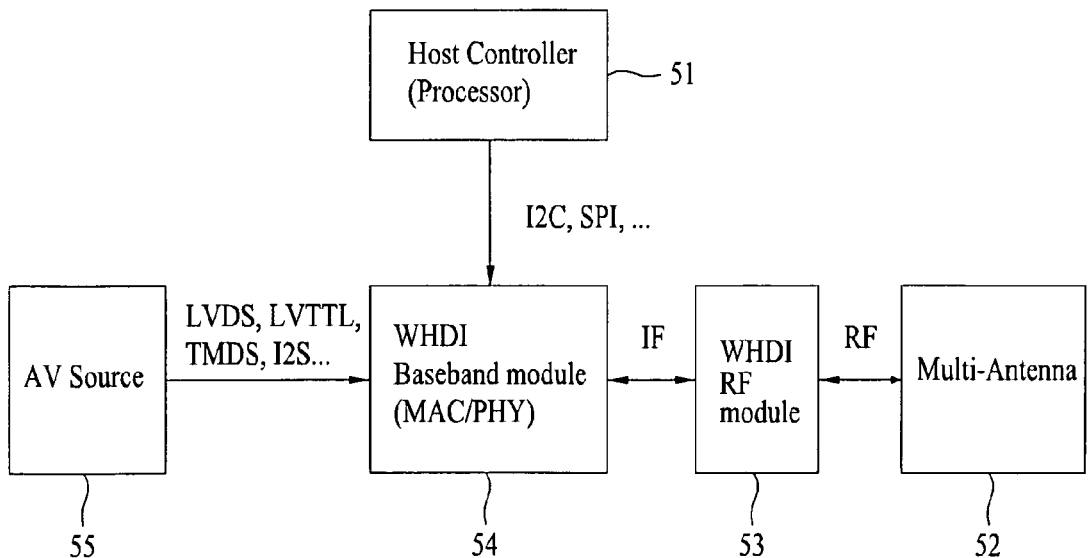
FIG. 5 is a block diagram illustrating an example of a sink device in a WHDI system.

FIG. 5 is a block diagram illustrating an example of a sink device in a WHDI system.

Referring to FIG. 5, like the aforementioned source device, a host controller 51 which is a kind of a processor unifies and manages an application, and takes the role to control a WHDI baseband module 54 using an I2C (inter integrated circuit) bus system structure. A WHDI RF module 53 converts RF signal received from a multi-antenna 52 to an intermediate frequency (IF), and transmits an A/V bus signal such as LVDS and I2S to an A/V sink device 55 by recovering the A/V data transmitted from the source device.

Figure 6:
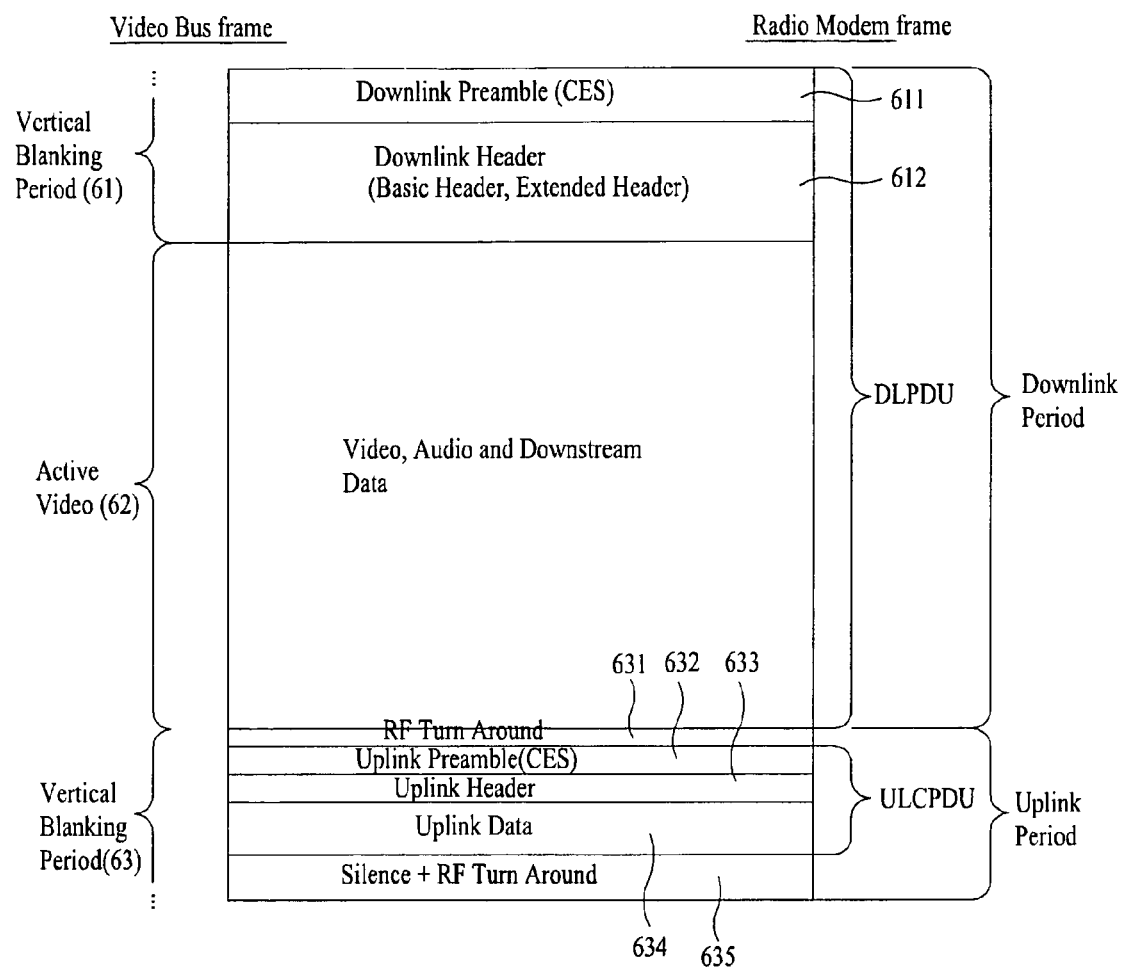
FIG. 6 is a timing flow chart illustrating a process of converting a general video signal including a vertical blanking period into an RF signal in a WHDI device which is transmitting and receiving A/V data.

FIG. 6 is a flow chart illustrating a process of converting a general video signal including a vertical blanking period into an RF signal in a WHDI device which is transmitting and receiving A/V data.

Generally, an interval where a source device continues to transmit a radio signal to a sink device will be referred to as a downlink interval. In the downlink interval, the source device transmits a downlink PHY data unit (DLPDU). The downlink interval can be divided into a vertical blanking period interval 61 and an active video period 62. First of all, the vertical blanking period interval 61 is divided into an interval 611 where the source device transmits a downlink preamble including channel estimation sequence (CES) to the sink device and an interval 612 where the source device transmits a downlink header to the sink device. The CES is a scheme that measures distortion of a received signal, which occurs as a transmitting signal passes through an unspecified radio channel, i.e., time delay, phase variation and attenuation by using a pilot signal included in the transmitting signal at a given pattern. In the active video period 62, the source device transmits A/V signals to the sink device.

The WHDI source device which is transmitting and receiving A/V signals can continue to transmit a signal having a bandwidth of 5 Ghz corresponding to a radio signal and including control information and video data for the downlink interval without seamlessness. The time required for the downlink interval corresponds to the time obtained by adding a part of the vertical blanking period interval of video bus (component, HDMI, LVTTL, etc.) to one of the active video period where actual video data are transmitted. In other words, the signal transmission time is determined in accordance with a type of data transmitted from the source device. In this case, for the downlink interval, the PHY signal can be transmitted in a unit longer than that of other RF communication as much as 10 ms or greater.

The downlink interval follows after the uplink interval. The uplink interval is an interval where the PHY layer of the sink device can transmit a radio signal to the source device. The uplink interval includes only a part 63 of the vertical blanking period interval of a video bus (component, HDMI, LVTTL, etc.). An uplink control PHY data unit (ULCPDU) corresponding to the uplink interval is divided into an RF turn around interval 631, an interval 632 for transmitting a preamble including CES, an interval 633 for transmitting an uplink header, an interval 634 for transmitting uplink data, and a silence and RF turn around interval 635.

The interval 632 for transmitting an uplink preamble including CES is a signal interval for synchronization of a device that receives an uplink radio signal. The silence and RF turn around interval 635 corresponds to the time required to convert a transmitting antenna to a receiving antenna or vice versa. Namely, the silence and RF turn around interval 635 is a temporary silence interval, and corresponds to the time required to convert a transmitting mode to a receiving mode in case of the sink device, and the time required to convert the receiving mode to the transmitting mode in case of the source device.

If the uplink interval ends, the preamble/CES transmission interval 611 and the downlink header transmission interval 612 of the downlink interval follow to fill the vertical blanking period interval 61.

In this way, the WHDI PHY layer which is transmitting A/V data can define the downlink transmission interval in accordance with time interval (i.e., interval between the vertical blanking period interval and the active video period) of an original signal (signal of wire bus) of video data which are transmitted. In the downlink and the uplink, OFDM and MIMO technologies are used for each transmission interval. However, different methods of generating and transmitting a PHY signal are used in the downlink and the uplink.

The source device configures its voice, video and control data through a DLPDU in the PHY layer using the downlink interval of the vertical blanking period interval 61 and the active video period 62 and then transmits the configured data to the sink device through the radio signal. The downlink interval is divided into a video dependent DLPDU mode for transmitting video data only and a video independent DLPDU mode for transmitting data having no relation with video data. Hereinafter, the video dependent DLPDU mode and the video independent DLPDU mode will be described with reference to FIG. 7 and FIG. 8.

Figure 7:
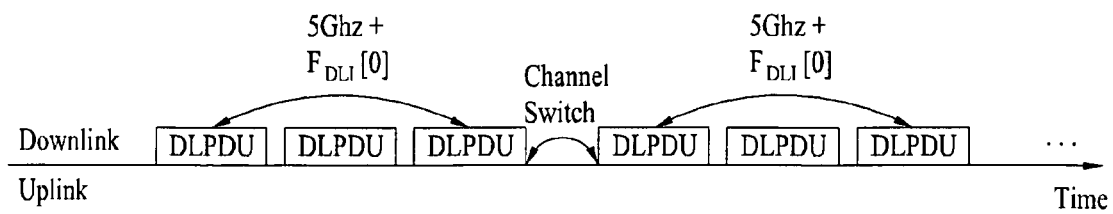
FIG. 7 is a diagram illustrating an example of a DLPDU sequence in case of a video independent DLPDU mode in a WHDI PHY layer.

FIG. 7 is a diagram illustrating an example of a DLPDU sequence in case of a video independent DLPDU mode in a WHDI PHY layer.

Referring to FIG. 7, the source device broadcasts its existence through the video independent DLPDU having no relation with A/V data to seek the sink device when the network starts. The video independent DLPDU is similar to a beacon message but is different from the beacon message in that time information for synchronization or control information such as a device list of the network is carried in the basic header (BH) and the extended header (EH) of the DLPDU so that the time information or the control information can be transmitted simultaneously with another kind of MAC command or AVC command. Another object of the video independent DLPDU is to allocate a short time period required to transmit an audio signal to the sink device. Since the video independent DLPDU does not need to synchronize with a video bus signal, it requires a relatively short time of 5 ms or less.

Referring to FIG. 7, when the source device transmits an independent DLPDU having no A/V data to seek the sink device, frequency $F_{DLI}[0]$ represents each central frequency range within the range of 5 Ghz U-NII. For example, $F_{DLI}[0]$ is 5150 Mhz and $F_{DLI}[1]$ is 5470 Mhz within the range of 5 Ghz U-NII. The source device broadcasts its information over all channels to allow the sink device in a standby mode for reception to respond to the broadcasted information.

Figure 8:
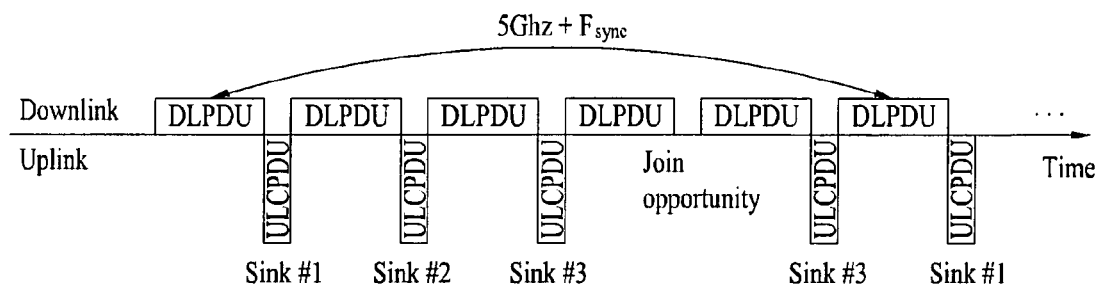
FIG. 8 is a diagram illustrating an example of a DLPDU sequence in case of a video dependent DLPDU mode in WHDI PHY layer.

FIG. 8 is a diagram illustrating an example of a DLPDU sequence in case of a video dependent DLPDU mode in WHDI PHY layer.

Referring to FIG. 8, an object of the video dependent DLPDU is to allow the source device to synchronize its frequency with a video signal prior to a radio signal. For example, if the source device is transmitting a video signal of 1080p 50 hz to the sink device using the downlink, a DLPDU signal is sustained for a time period of about 18 ms corresponding a signal interval when an active video signal, i.e., DE signal is on in the active source device. As illustrated in FIG. 8, if the interval where the first DLPDU is transmitted ends, a direction of a signal is changed and the first sink device transmits uplink control PHY data unit (ULCPDU) data to the source device using the uplink. Afterwards, if the ULCPDU signal is transmitted from the first sink device to the source device, next DLPDU signal is transmitted and the ULCPDU signal is transmitted from the second sink device to the source device. In this way, this process is repeated. Header information of the ULCPDU and the DLPDU is included in the vertical blanking period interval of the video signal. Namely, the sink device can transmit the PHY signal for a relatively short time of 500 us or less.

Figure 9:
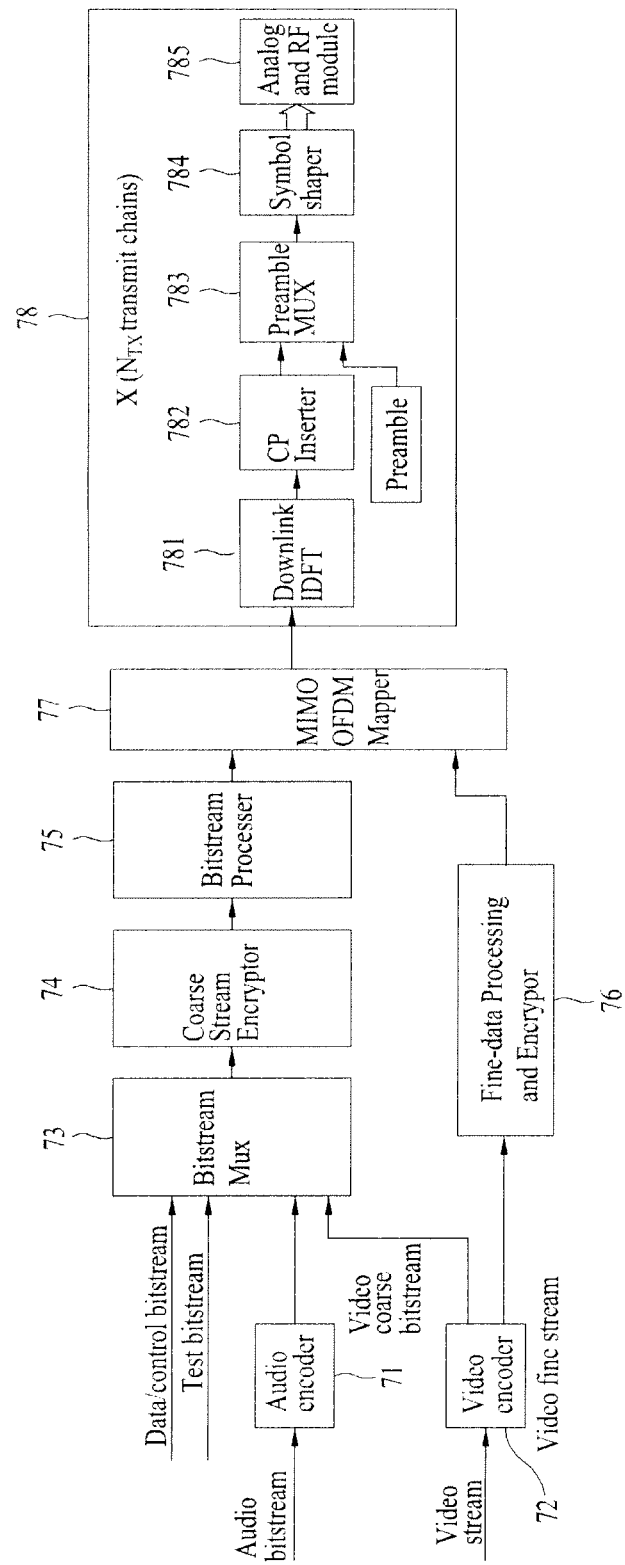
FIG. 9 is a diagram illustrating an example of a PHY structure that transmits a DLPDU in a WHDI system.

FIG. 9 is a diagram illustrating an example of a PHY structure that transmits a DLPDU in a WHDI system.

In a DLPDU PHY structure of a WHDI active source device, a radio encoding process can be implemented in various manners in accordance with a type of data which will be transmitted. Particularly, in case of video data, each frame (for example, each image) is decomposed into one or more color components Y, Cb, Cr, and a frame of the decomposed color components is decomposed into frequency components and then quantized. In this case, a fine of the quantized result is split into video fine streams, and the quantized frequency components are split into video coarse bitstreams. A separate channel encoding process is applied to the video fine streams and the video coarse bitstreams even in case of the same video data.

Referring to FIG. 9, data transmitted in the WHDI DLPDU PHY structure are divided into data/control bitstreams which are message command data requested from the MAC layer and the AVCL, test bistreams which are given bit patterns mixed with data by the receiving side to verify signal accuracy, audio bitstreams transmitting audio data, and video bitstreams transmitting video data. The video bitstreams are subdivided into video coarse bitstreams transmitting quantized video data and video fine streams which are bitstreams of an error value corresponding to each of the quantized data.

The video coarse bitstreams are bitstreams of coefficients obtained by applying de-correlation transform (DCT) to video data and quantizing the video data. The video fine bitstreams are bitstreams of a quantizing error generated after DCT is applied to video data.

As described above, a method of generating a signal is varied depending on a type of data transmitted from the PHY system. Referring to an example illustrated in FIG. 9, audio data and video data go through encoders 71 and 72, respectively, and other control data such as data/control bitstremas and test bitstreams are transmitted to a bitstream MUX 73 without going through encoding. Among the video data, the video coarse bitstreams are transmitted to the bitstream MUX 73 after going through encoding, whereby a total of four signals are unified to form one bitstream. At this time, the video dependent DLPDU mode includes video coarse bitstreams but the independent DLPDU mode excludes the video coarse bitstreams.

Next, a coarse stream encryptor 74 encrypts all data excluding header information (BH and EH) from a signal input from the bitstream MUX 73 as one bitstream, in accordance with AES-128 mode. A bitstream processor 75 modulates the encrypted signal to a radio signal (symbol) based on a QAM mode and adds an error correction code.

Meanwhile, the video fine data are processed independently by a fine data processing and encryption module to transmit data more safely unlike the aforementioned four data. At this time, the fine data processing and encryption module 76 includes a fine-data scaling module, a fine-data symbol mapper, a fine-data encryptor, and a fine-data scrambler.

In the aforementioned example, a total of five data gone through the aforementioned separate processing procedure are the video fine data gone through the fine data processing and encryption module 76 and the other four data unified into one data. These five data are input to a MIMO OFDM mapper 77. The MIMO OFDM mapper 77 distributes the input signal into the RF-chain module 78 through subcarrier or each transmitting antenna to apply MIMO based on antenna diversity, channel matrix calculation and DCT. In this case, each dedicated subcarrier can be allocated using carrier signals having different central frequencies for each of video coarse data and video fine data.

In the Nth transmit chains 78, a downlink IDFT unit 781 transforms each subcarrier signal which is finally calculated, on a time axis and unifies the subcarrier signals. A CP inserter 782 copies a block of a certain size at a rear part of a previous symbol into a front part of next symbol to avoid multi-path interference that may occur between OFDM symbols. A preamble Mux 783 performs signal realignment so that only preamble data are transmitted from the preamble transmission intervals 611 and 632 illustrated in FIG. 6. A symbol shaper 784 performs signal processing so that signal intensity in a frequency domain is within the range of a spectral mask requested by the WHDI system. The final signal is converted into an analog signal by a digital/analog converter of an analog and RF module 785, and the converted intermediate frequency (IF) is converted into a radio frequency (RF) signal of 5 Ghz through a mixer and then transmitted through an antenna.

The process of transmitting audio signal and video signals through an antenna in the DLPDU PHY structure of the WHDI system has been described as above.

In short, the active source device of the WHDI system always performs DCT for video data directly input from the PHY layer before transmitting the radio signal. As the DCT video data are quantized, transmission data are compressed, whereby more data are transmitted within a limited bandwidth. The quantized video data are split into video coarse data and video fine data, to which separate error correction encoding processes are applied. Alternatively, separate modulation modes can be applied to the video coarse data and the video fine data.

Hereinafter, each element in a subsystem of a DLPDU PHY layer of a WHDI active source device will be described in more detail.

Figure 10:
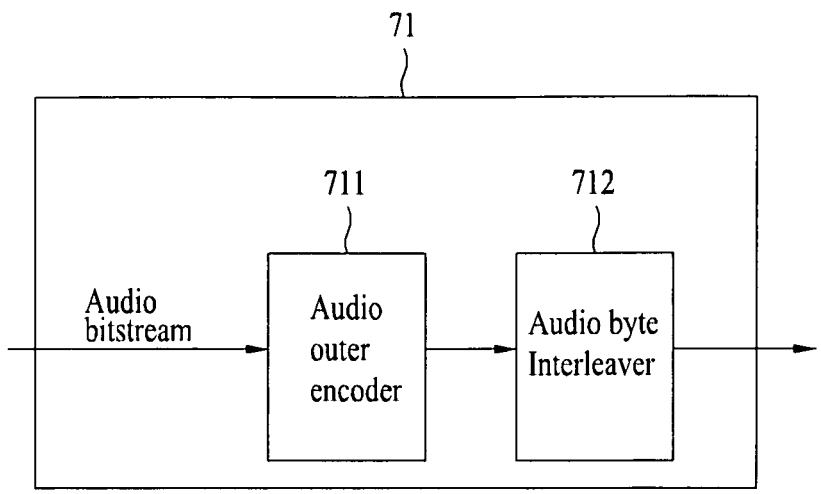
FIG. 10 is a diagram illustrating a structure of an audio encoder in an example of a DLPDU PHY structure of a WHDI active source device.

FIG. 10 is a diagram illustrating a structure of an audio encoder in an example of a DLPDU PHY structure of a WHDI active source device.

Referring to FIG. 10, the audio encoder 71 includes an audio outer encoder 711 and an audio byte interleaver 712. The audio outer encoder 711 uses a Reed-Solomon mode as preprocessing of audio data. In this case, a polynomial, $P(x) = 1 + x^2 + x^3 + x^4 + x^8$, is used. For example, equivalent data of 16 bytes are added to data of 239 bytes, whereby data of a total of 255 bytes are generated. These resultant data values are again interleaved by a convolutional byte-interleaver of an audio byte interleaver 712. In this case, distortion of an audio signal, which occurs due to a radio error, can be reduced.

Figure 11:
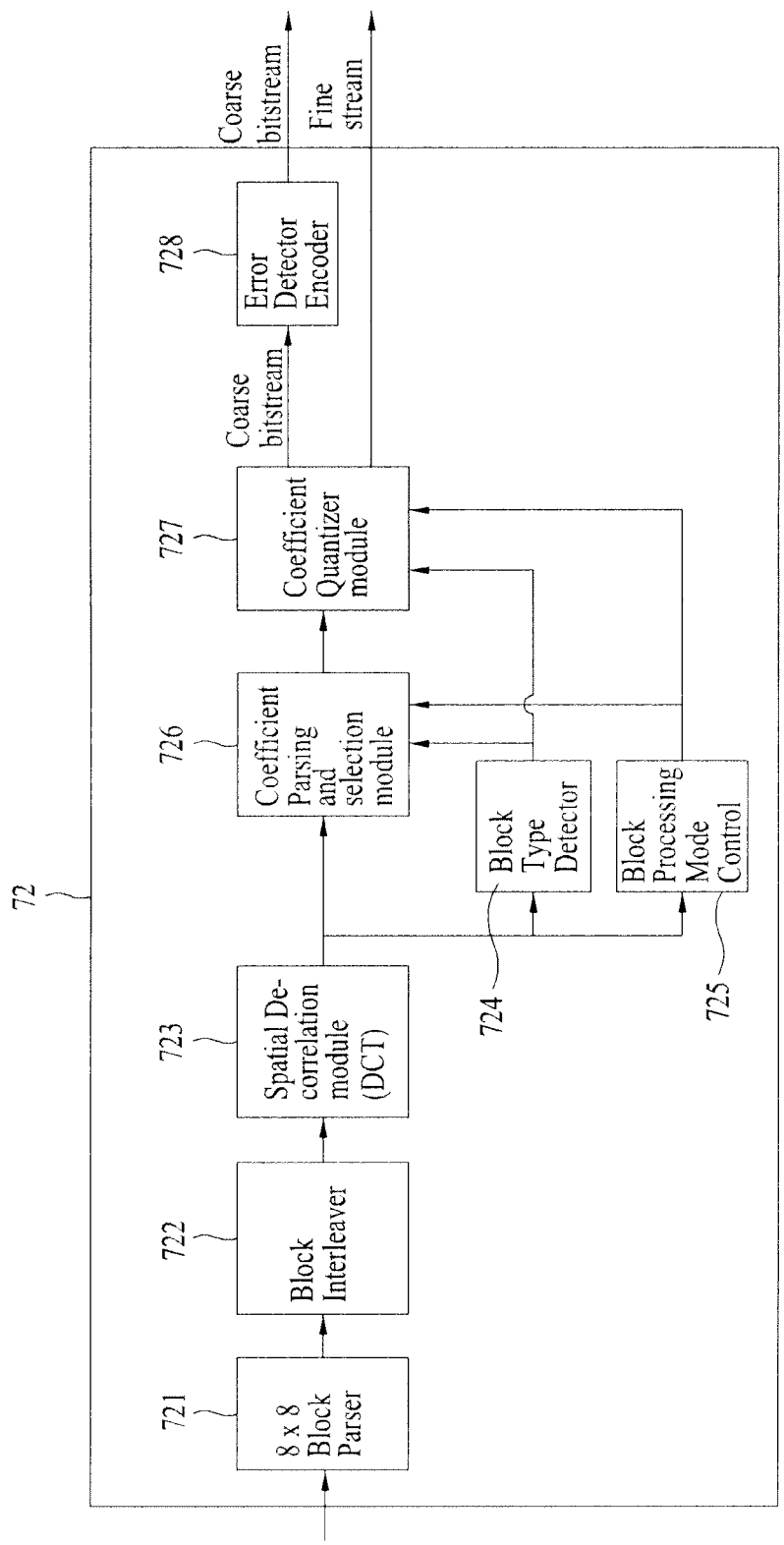
FIG. 11 is a diagram illustrating a structure of a video encoder in an example of a DLPDU PHY structure of a WHDI active source device.

FIG. 11 is a diagram illustrating a structure of a video encoder in an example of a DLPDU PHY structure of a WHDI active source device.

The video encoder 72 performs DCT for uncompressed video data (for example, pixel) of Y, Cb, Cr types using a frequency domain, divides the transformed signal into a DC component and an AC component, quantizes the components, and extracts errors generated during a quantizing process as video fine streams. The video encoder 72 extracts the quantized value as video coarse streams. After performing DCT using a frequency domain, the video encoder 72 selects high energy coefficients of low frequency components as much as available transmission capacity measured in the MAC layer and transmits the selected high energy coefficients to a unit for next process and discards the other signals.

In more detail, referring to FIG. 11, for DCT of video data, all pixels are grouped into a block of 8×8 by a block parser 721. For example, if block grouping is performed for pixels of 1920×1080 full HD size, the pixels can be grouped into a block of 240×135. Since grouping is performed in a block of 8×8, buffering should be performed in such a manner that horizontal blanking of a video bus is stored in a video memory of a transmitting side at least eight times.

Figure 12:
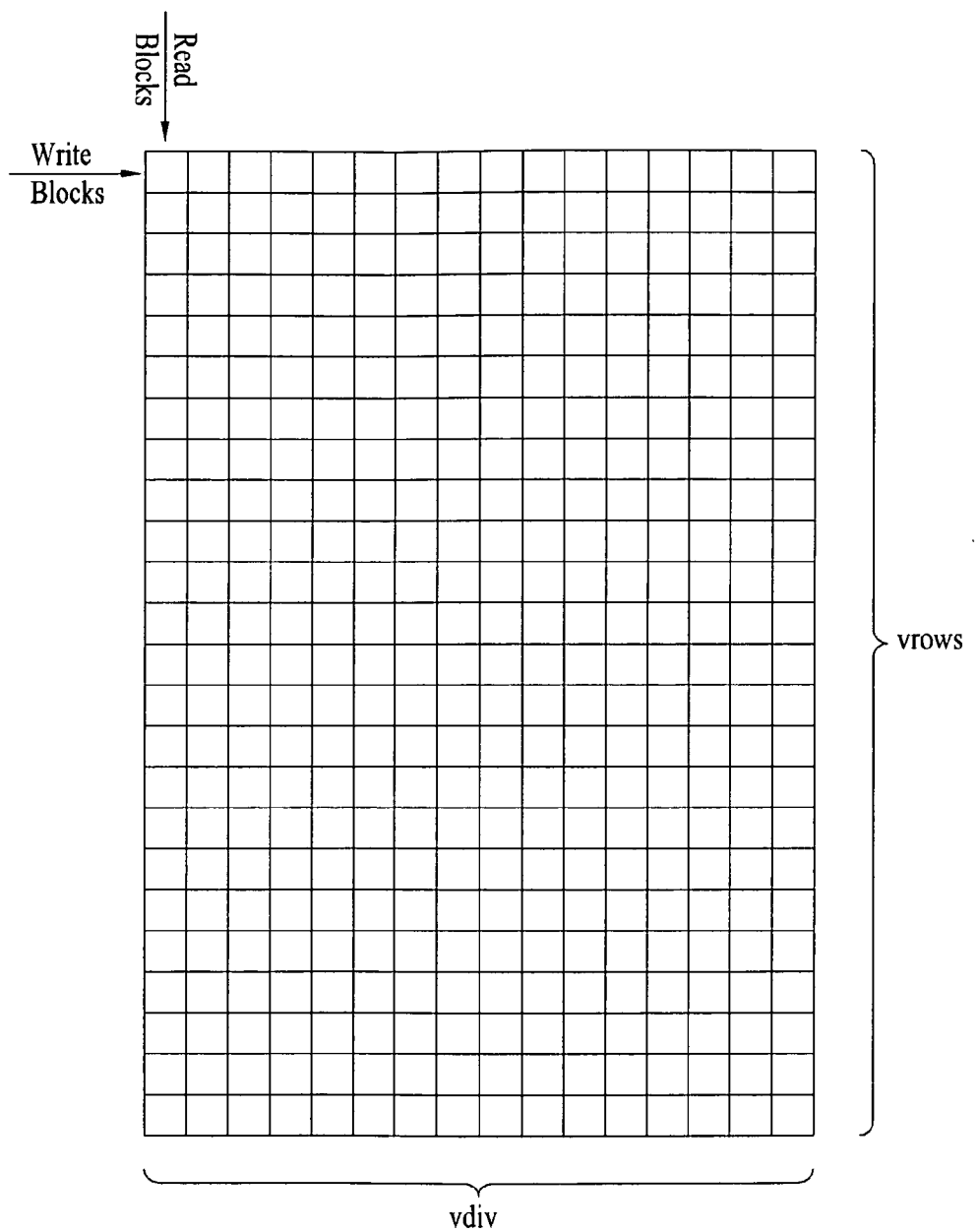
FIG. 12 is a diagram illustrating an example of block interleaving performed by a video encoder of FIG. 11.

A block interleaver 722 interleaves columns and rows as illustrated in FIG. 12 for blocks of 240×135 or some blocks in the whole screen of 1920×1080 full HD size, for example, to avoid a burst error. FIG. 12 is a diagram illustrating an example of block interleaving performed by a video encoder of FIG. 11.

A spatial de-correlation module 723 that performs DCT transforms each block where columns and rows are permutated by the block interleaver 722, into frequency components through DCT. Namely, to generate a set of coefficients for each block, the spatial de-correlation module 723 performs spatial de-correlation within each block. Spatial de-correlation is varied depending on a value of a coefficient corresponding to the signal transformed into frequency components. Referring to FIG. 11, the signal transformed into frequency components is input to a coefficient parsing and selection module 726 that parses and selects coefficients, in accordance with coefficient values, or input to the coefficient parsing and selection module 726 through a block type detector 724 that determines a type of each block and a block processing mode controller 725 that controls a processing mode of each block.

The block type detector 724 detects a type of each video block. At this time, two block types are defined: type 0 and type 1. Typically, after DCT, blocks with low energy at their high frequency coefficients are of type-0, while blocks with high energy at their high frequency coefficients are of type-1. The specific block type decision rule may be implementer specific that can meet the video quality requirements.

A block processing mode controller 725 performs a processing mode for all blocks by using either a first mode or a second mode. The first mode is a basic mode and is intended for all blocks, while the second mode is a refinement mode and is intended for blocks which do not change throughout a number of consecutive video frames. The specific block processing mode decision rule may be implementer specific that can meet the video quality requirements. The first mode applies a quantizing process by selectively discarding high frequency components from the DCT video signal, and can generate relatively small video data. On the other hand, in the second mode, high frequency components are discarded from the DCT video signal, and relatively many video data can be transmitted through quantizing and error signal extracting processes. However, to apply the second mode when the source device transmits video data, the sink device should support the second mode that is the refinement mode. If there is no process of applying the second mode to all blocks and discarding high frequency components, uncompressed transmission can be performed.

The coefficient parsing and selection module 726 parses and selects video coarse stream coefficients of each block based on the block type detected by the block type detector 724, block processing mode control indication performed by a block processing mode controller 725, a coefficient information table for selecting a proper coefficient, and available bandwidth provided by the MAC layer.

$N_{Coeffs\_per\_Block}$ is set by the MAC layer. $N_{Coeffs\_per\_Block}$ is a coefficient value per block and is determined by considering current radio receiving sensitivity and other throughput values. For example, if a radio channel status is not good due to a long distance between the source device and the sink device, $N_{Coeffs\_per\_Block}$ is set to have a small value, whereby all other coefficients corresponding to high frequency components shall be discarded.

A coefficient quantizer module 727 performs quantization for signals transmitted from the block type detector 724, the block processing mode controller 725, and the coefficient parsing and selection module 726. To generate video coarse bitstreams and video fine bitstreams of complex symbol values, the coefficient quantizer module 727 can quantize coefficients of each block based on the type of each block, detailed control indication information, proper quantizing table, and available bandwidth provided by the MAC layer.

A subset of the DCT coefficients is quantized for each video block. Each coefficient that is quantized produces two outputs: a video fine coefficient and a sequence of one or more quantization bits. The coefficients that are not quantized remain unchanged and are hereinafter referred to as video fine coefficients.

The quantizing process performed by the coefficient quantizer module 727 shall be supported as follows:

1) 9 different uniform quantizers that may be used for the DC DCT coefficients (i.e. $X^D[0,0]$). Each quantizer is specified by the number of its output bits; and 2) 3 different non-uniform quantizers that may be used for the non-DC DCT coefficients, i.e., AC components (i.e. $X^D[k, l]$ k=0, 1, 2, . . . , 7 l=0, 1, 2, . . . , 7 $\{k,l\} \neq \{0,0\}$,). Each quantizer is specified by the number of its output bits.

Each N-bit coefficient quantizer is defined by $2^N$ quantization value and $2^N$ quantization regions; the $2^N$ quantization values, each corresponding to one quantization region, and the $2^N$ quantization regions including $2^N$ N-bit sequences, each corresponding to one quantization region. It is supposed that the DCT-coefficient is quantized by $X^D$, and the quantization is quantized by an N-bit quantizer by:

$$X^D \xrightarrow{N} \{\tilde{X}^D, b_0 b_1 \ldots b_{N-1}\}.$$

The quantization process is done as follows:

1) find the quantization region $r^i$ within which the coefficient $X^D$ is lying. Mathematically this is done according to:

$$X^D \xrightarrow{N} r^i \text{ iff } R^i_{min} \le X^D < R^i_{max}$$

where if means if and only if;

2) quantize the coefficient $X^D$ to produce the quantization value $q(X^D)$ corresponding to the quantization region $r^i$;

3) generate the N-bit sequence $b_0 b_1 \ldots b_{N-1}$ corresponding to the quantization region $r^i$. This N-bit sequence is the bit sequence output of the quantization process with the output bit $b_0$ being the earliest in the stream; and 4) calculate the quantization error defined by: $\tilde{X}^D = X^D - q(X^D)$. This quantization error is the video fine coefficient output of the quantization process.

For the coefficients that are not quantized, $\tilde{X}^D = X^D$, and no bit sequence is generated.

Hereinafter, the quantization bits produced for each video block will be described with reference to FIG. 13. FIG. 13 is a diagram illustrating quantization bits produced for each video block in a DLPDU PHY structure of a WHDI active source device.

The selection of the quantized coefficients and the number of bits are allocated depending on the first block mode (basic mode) or the second block mode (refinement mode), video format and Bandwidth limitations. For blocks processed with the second mode, all quantization bits are set to 0.

For every block, the number of total quantization bits is $N_{Bits\_per\_Block}$, as set by the MAC layer. The MAC layer also provides the parameter $N_{Bits\_fraction}$ with a value greater or equal to 0 and smaller than 64. This value is used for rate adjustment, by appending a single '0' valued bit to the first $N_{Bits\_fraction}$ video blocks output within every group of 64 video blocks. At this time, rate adjustment starts from the first video block, by attaining a constant bit rate when averaging over groups of 64 blocks. This bit is referred to as "rate adjustment bit". The rate adjustment bit, if added, is added after all quantization output bits of the block. The bits generated for each video block shall further be prepended by a "type bit", indicating the type of the video block. The type bit shall precede any quantization bit and rate adjustment bit (if produced). The type bit shall take the value '0' for type 0 blocks, and the value '1' for type 1 blocks.

The type bit, quantization bits, and rate adjustment bit (if added) shall be further prepended by a "processing bit", indicating the processing of the video block. The processing bit shall be set to 0 by the source device for all blocks when a signal is transmitted to a sink that does not support the second mode.

After the quantizing process is performed, the video fine streams are extracted, which correspond to the difference between the quantized coefficient and a previous value prior to quantization.

The bitstream MUX 73 multiplexes the four bitstreams (data/control bitstream, audio encoder output bitstream, video coarse bitstream, test bitstream) for further processing as one coarse bitstream. At this time, the header information (BH, EH) is excluded from the control information. The coarse stream encryptor 74 encrypts video coarse bitstreams excluding header information (BH, EH) processed as one stream by the bitstream MUX 73.

Next, the bitstream processor 75 will be described with reference to FIG. 14.

Figure 14:
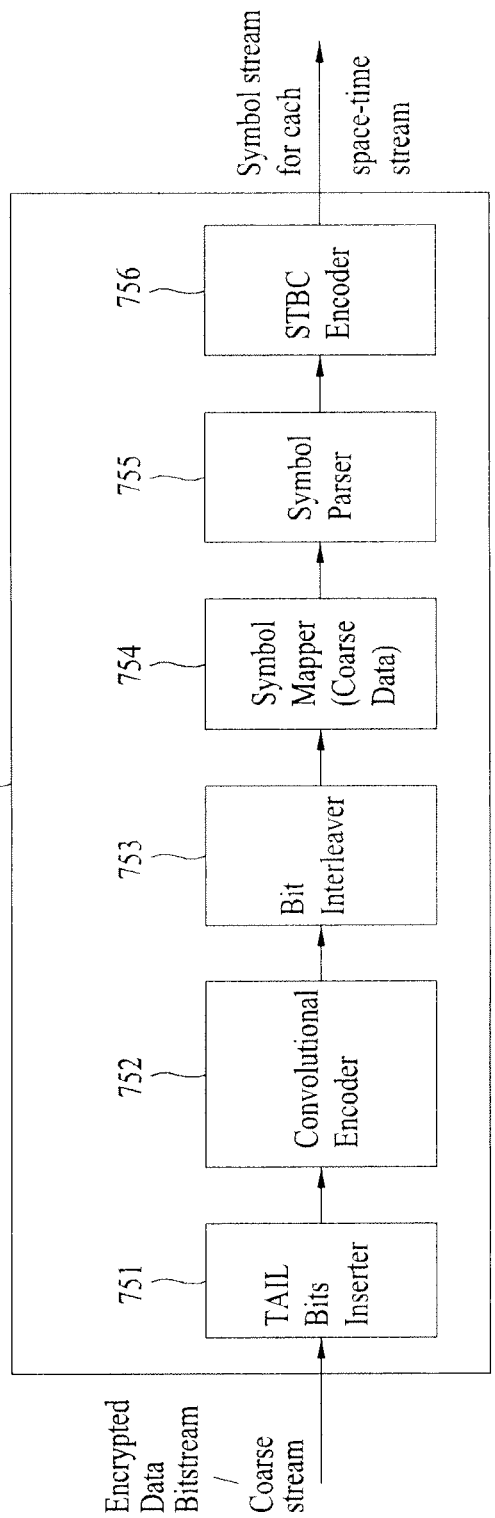
FIG. 14 is a diagram illustrating a bit stream processor in an example of a DLPDU PHY structure of a WHDI active source device.

FIG. 14 is a diagram illustrating a bitstream processor in an example of a DLPDU PHY structure of a WHDI active source device.

The bitstream processor 75 includes a TAIL bits inserter 751, a convolution encoder 752, a bit interleaver 753, a symbol mapper 754, a symbol parser 755, and a space time block code (STBC) encoder 756.

The video coarse bitstreams are transmitted with an error correction code more reinforced than that of the video fine streams. Referring to FIG. 14, the convolution encoder 752 and the STBC encoder 756 add the error correction code to the video coarse bitstreams. At this time, in addition to the video coarse bitstreams, other data streams gone through the encryption process by being multiplexed by the bitstream MUX 73 also go through the bitstream processor.

Figure 15:
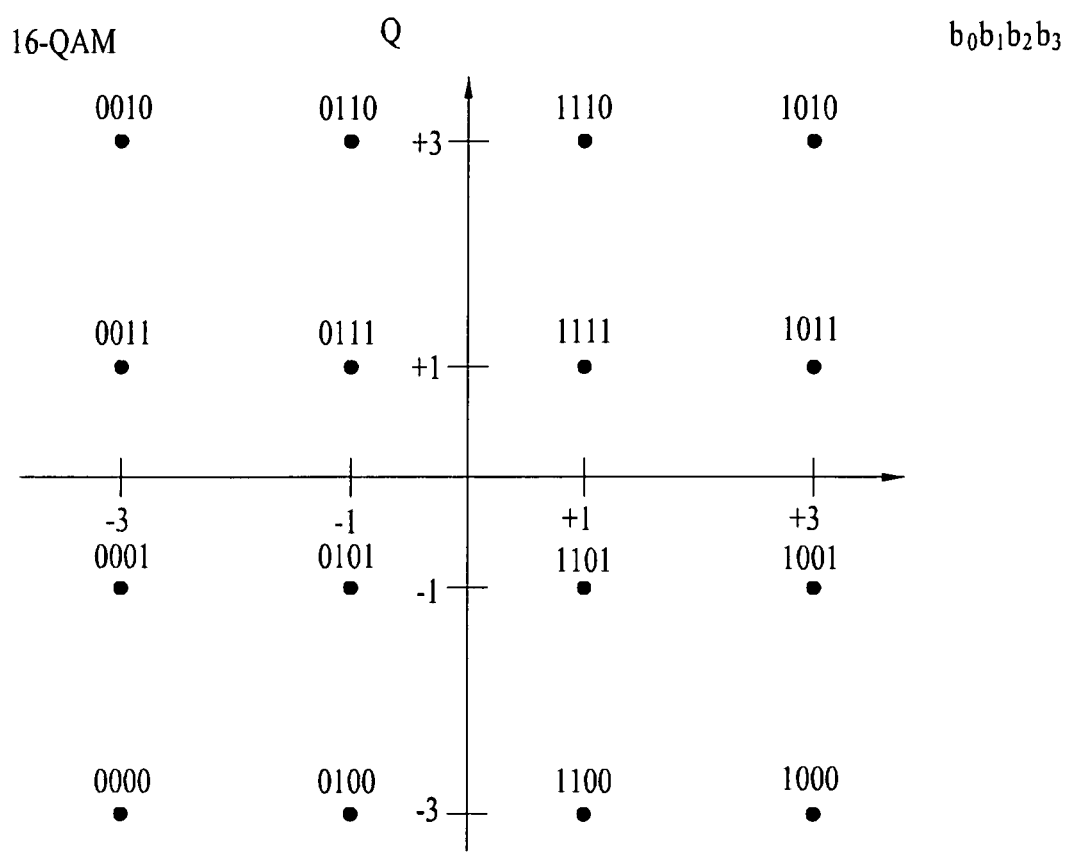
FIG. 15 is a diagram illustrating 16QAM arrangement of video coarse streams for conversion to IQ orthogonal phase coefficients in an example of a DLPDU PHY structure of a WHDI active source device.

The TAIL bits inserter 751 adds the last bit '0' to receive the input of the convolution encoder. Encoding rates of ½, ¾ and ⅚ are used by each encoder. The encoding rate can be varied depending on the radio status. For example, the encoding rate of ½ is used if the radio status is good, and ⅚ is used if not so. The bitstreams gone through the convolution encoder 752 are spread together with adjacent bits by the bit interleaver 753. The symbol mapper 754 converts the video coarse bitstreams into IQ orthogonal phase coefficients for conversion to analog signals. As illustrated in FIG. 15, bitstreams of the video coarse streams can always be encoded by only 16-QAM.

FIG. 15 is a diagram illustrating 16QAM arrangement of video coarse streams for conversion to coefficients of IQ orthogonal phase in an example of a DLPDU PHY structure of a WHDI active source device. In 16QAM, four bitstreams are converted into one symbol.

Figure 16:
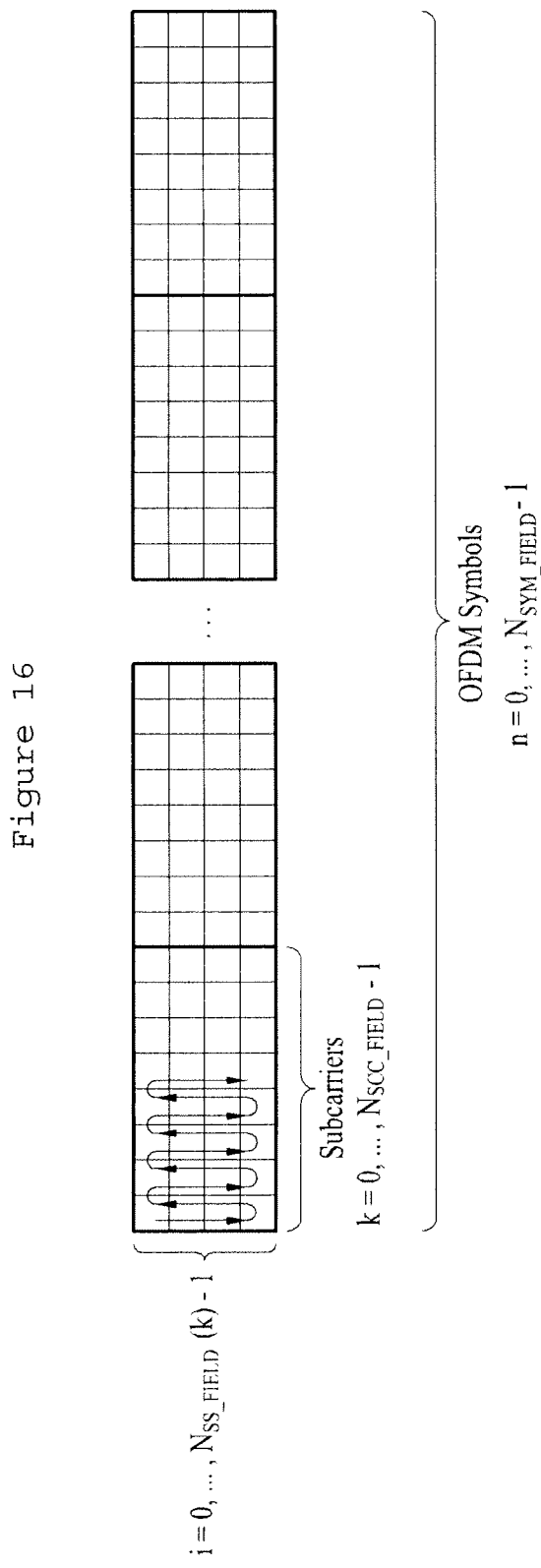
FIG. 16 is a diagram illustrating an example of a process of parsing OFDM symbols in a symbol parser in an example of a DLPDU PHY structure of a WHDI active source device.

FIG. 16 is a diagram illustrating an example of a procedure of parsing OFDM symbols in a symbol parser in an example of a DLPDU PHY structure of a WHDI active source device.

A DLPDU symbol parser 725 distributes 16-QAM symbols to demodulated symbol streams in the order of subcarriers allocated to the video coarse streams and spatial streams (transmit chain).

The DLPDU uses a plurality of spatial streams due to its more transmission rate (200 Mbps or greater in case of 1080p) than that of uplink data. Referring to FIG. 16, the DLPDU symbol parser 725 converts input streams of IQ complex signals into vectors such as OFDM symbols, subcarriers, and spatial streams.

For example, it is supposed that four MIMO channels, Nsym number of OFDM symbols, and Nscc number of subcarriers exist. In this case, <OFDM symbol#1, Subcarrier#1, Spatial Stream#1><OFDM symbol #1, Subcarrier #1, Spatial Stream #2><OFDM symbol #1, Subcarrier #1, Spatial Stream #3><OFDM symbol #1, Subcarrier #1, Spatial Stream #4><OFDM symbol#1, Subcarrier #2, Spatial Stream #1><OFDM symbol #1, Subcarrier #2, SpatialStream OFDM symbol #2, Subcarrier #1, SpatialStream #1><OFDM symbol#2, Subcarrier#1, SpatialStream#2> . . . <OFDM symbol#Nsym, Subcarrier#Nscc, SpatialStream#3><OFDM symbol#Nsym, Subcarrier#Nscc, SpatialStream#4> are sequentially allocated to input data, Complex 0, Complex 1, . . . , Complex T, . . . .

The STBC encoder 756 shown in FIG. 14 adds repeated error correction code to each spatial stream to reinforce error correction possibility.

Hereinafter, fine data processing and encryption performed by the fine data processing and encryption module 76 will be described with reference to FIG. 17.

Figure 17:
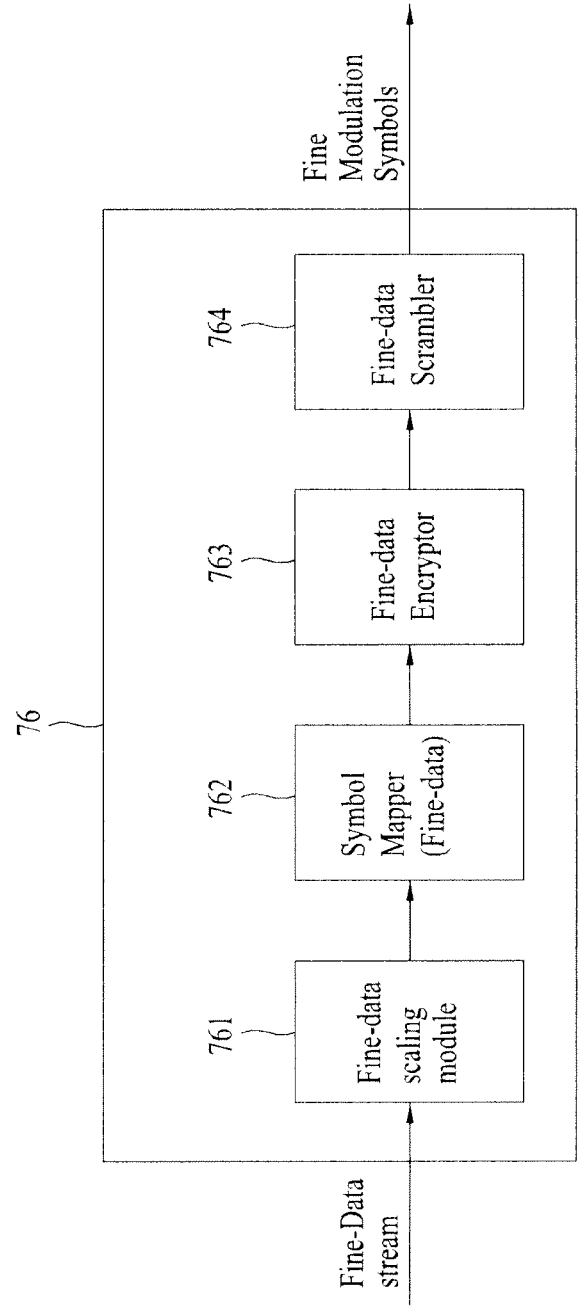
FIG. 17 is a diagram illustrating a fine data processing and encryption module in an example of a DLPDU PHY structure of a WHDI active source device.

FIG. 17 is a diagram illustrating a fine data processing and encryption module in an example of a DLPDU PHY structure of a WHDI active source device.

The video fine data streams gone through the video encoder 72 go through fine data scaling in the fine data processing and encryption module 76. A fine-data scaling module 761 where fine data scaling is performed uses a variable scaling elements depending on whether each video block grouped into 8×8 is type 0 or type 1. For example, all fine data included in the video block of type 0 are multiplied by 1.75, while all fine data included in the video block of type 1 are multiplied by 1. In this way, scaling is performed.

Afterwards, the scaled video data go through symbol mapping in the symbol mapper 762. Fine data modulation is different from general digital/analog modulation (BPSK, QPSK, QAM). First of all, one fine data stream is grouped into two fine data, for example, fine data of Y component in one pixel and fine data of Chroma component. As one fine data stream is divided into two groups, one modulation symbol includes two fine data after the fine data processing encryption procedure is completed. The first fine data has a real number value, and the second fine data has an imaginary value. In the modulation process, a symbol ± is used as it is before modulation is performed, and modulation is performed using an orthogonal phase carrier complex mode. For example, when each IQ has a size of ±2047 and a maximum available value of fine data is 1007.5, the first data is +22 and the second data is −24. In this case, IQ is given as follows: I=(22*2)+32=76, Q=(−24*2)+32=−80. This is advantageous in that twice more data than those of the fine data stream modulation mode such as 16QAM and 64QAM can be expressed in one symbol. As described above, when fine data are modulated in the active source device, one of fine data elements corresponding to Y, Cb, Cr components of one pixel is not decomposed into components I and Q. Instead, one of fine data elements is connected with I component and the other fine data element is connected with Q component.

Afterwards, the fine data encryptor 763 encrypts the symbols gone through the modulation process as complex input signals using AES-128 CTR in accordance with a key set in the fine data encryptor. The encrypted complex output signals are scrambled by a fine data scrambler 764 to avoid burst error.

The MIMO-OFDM mapper 77 maps coarse-data complex valued symbols, fine-data complex valued symbols, fixed pilots, and moving pilots into appropriate space time streams, subcarriers, and OFDM symbols. The MIMO-OFDM mapper 77 also allocates a specific subcarrier as a subcarrier for the fixed pilots and the moving pilots, whereby the receiving side performs time synchronization or channel measurement using the subcarrier.

The preamble MUX 783 performs multiplexing between the preamble field and all other (CES, BH, EH, IQ, DATA) fields, thus generating the entire DLPDU. During the time designated for preamble field, the preamble MUX 783 selects as input the preamble, whereas during the time designated for other fields (CES, BH, EH, IQ, DATA), the preamble MUX 783 selects as input, the output of the OFDM modulator.

Figure 18:
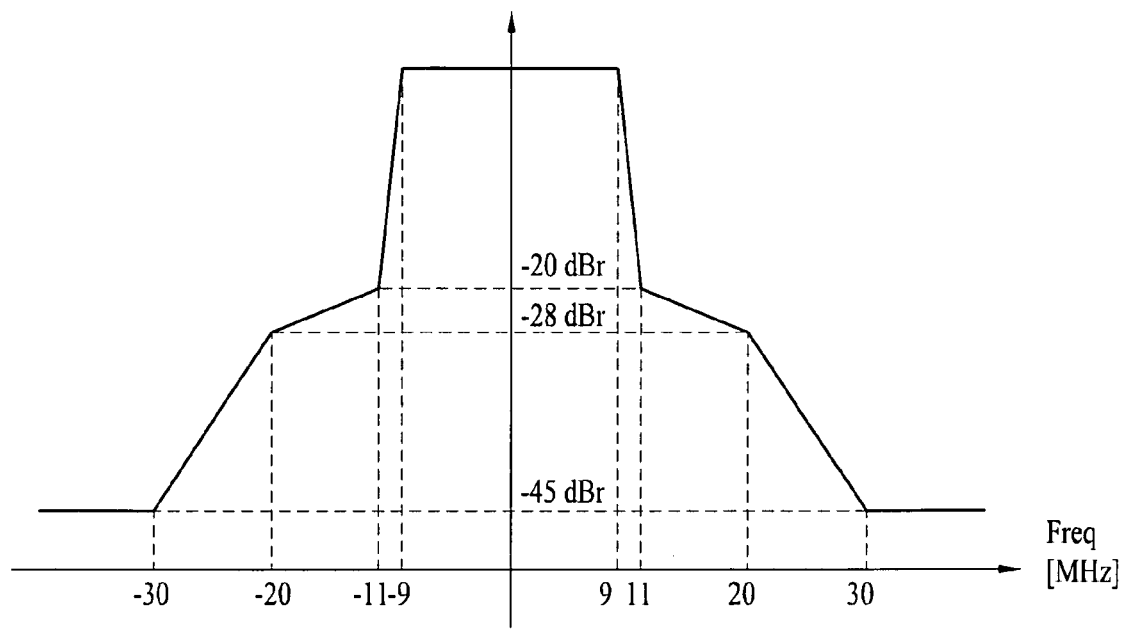
FIG. 18 is a diagram illustrating an example of a spectrum during DLPHY RF transmission in a WHDI active source device.

The symbol shaper 784 performs symbol shaping such that the spectral mask as defined in FIG. 18 is met.

FIG. 18 is a diagram illustrating an example of a spectrum during DLPHY RF transmission in a WHDI active source device.

Figure 1:
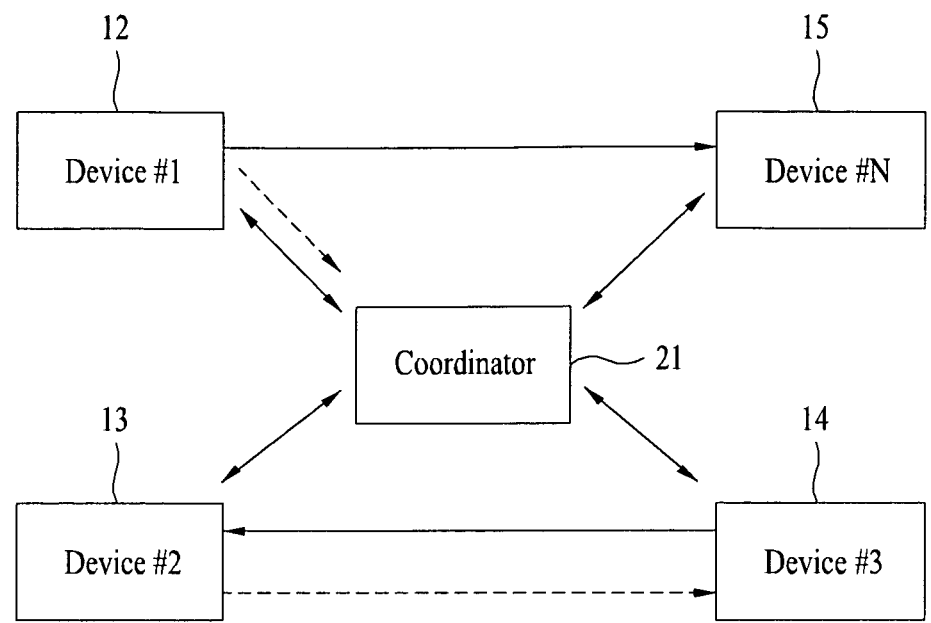
FIG. 1 a brief diagram illustrating an example of user devices constituting WVAN.

The overall transmitted Baseband signal is composed of the contribution of all the fields, and fulfills the following Equation 1.

$$r_{DLPDU}^{(iTx)}(t) = r_{Pre}^{(iTx)}(t) + r'^{(iTx)}_{CES}(t - t_{CES}) + r'^{(iTx)}_{BH}(t - t_{BH}) + \qquad \text{[Math Figure 1]}$$
$$r'^{(iTx)}_{EH}(t - t_{EH}) + r'^{(iTx)}_{IQ}(t - t_{IQ}) + \tilde{r}'^{(iTx)}_{DATA}(t - t_{DATA}),$$

where $r'^{(iTx)}_{CES}(t)$, $r'^{(iTx)}_{BH}(t)$, $r'^{(iTx)}_{EH}(t)$, $r'^{(iTx)}_{IQ}(t)$ are filtered versions of $r^{(iTx)}_{CES}(t)$, $r^{(iTx)}_{BH}(t)$, $r^{(iTx)}_{EH}(t)$, $r^{(iTx)}_{IQ}(t)$, respectively. The DLPHY signal generated by the symbol shaper 784 has a frequency feature of a maximum spectral mask as illustrated in FIG. 18.

Next, the uplink where the PHY signal is transmitted from the WHDI system to the sink device or from the passive source device to the active source device will be described.

As described above, the active source device transmits video data or audio data to one or more devices, and the passive source device is additionally connected with the active source device without transmitting video data. The sink device receives video data or audio data from the active source device. Hereinafter, it is regarded that the sink device which will be described later includes the active source device.

In the PHY interval, the uplink interval is divided into a mode that generates an uplink independent PHY data unit (ULIPDU) and a mode that generates an uplink control PHY data unit (ULCPDU).

The ULIPDU transmits a signal intended to notify its existence while circulating several channels within a 5 Ghz UNII band to detect the source device in a state that the sink device is connected with a specific source device but is not connected with the MAC layer. The ULCPDU corresponds to a PHY mode where the radio device connected with the active source device transmits a control signal to another device using a short time by avoiding the DLPDU, as described with reference to FIG. 7.

Hereinafter, generation of ULIPDU will be described with reference to FIG. 19 to FIG. 23.

Figure 19:
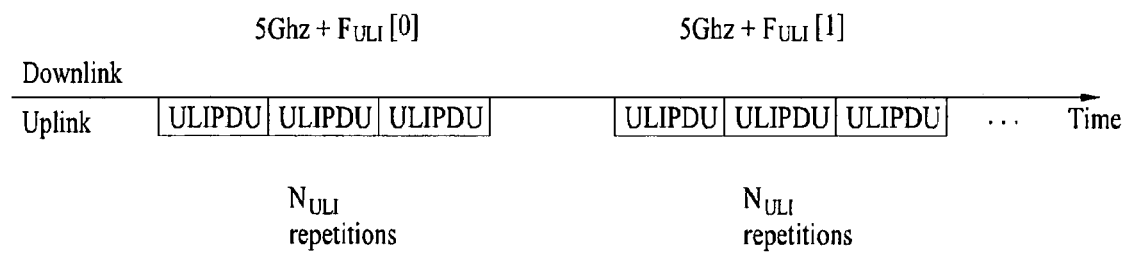
FIG. 19 is a diagram illustrating an example of ULIPDU transmission from a sink device to a source device in a WHDI system.

FIG. 19 is a diagram illustrating an example of ULIPDU transmission from a sink device to a source device in a WHDI system.

The ULIPDU is similar to the video independent DLPDU having no relation with video data, and has a relatively long signal time. The ULIPDU consecutively transmits several signals or repeatedly transmits the signal with a short pause time, and then receives a response to the transmitted signal. As illustrated in FIG. 19, after transmitting 8750 ULIPDU signals of 400 uS for 3500 msec, the ULIPDU waits for a signal response for 400 ms and again transmits a set of 8750 same ULIPDU signals. Namely, a group of the sink devices of the ULIPDU forms one $T_{uli}$ period and guides a response of the source device while circulating a 5 Ghz U-NII frequency band such as Fuli[0] and Fuli[1].

Figure 20:
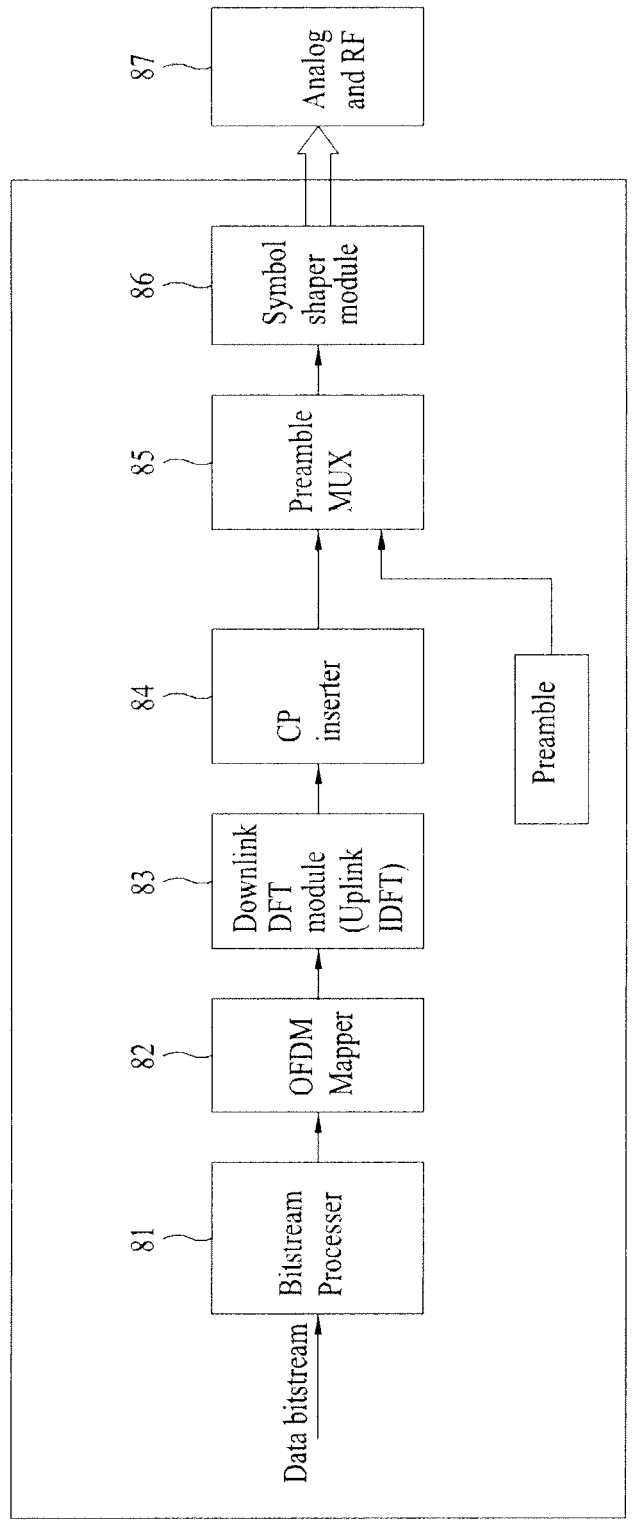
FIG. 20 is a block diagram illustrating a transmitting device that performs ULIPDU transmission to a receiving device in a WHDI system.

FIG. 20 is a block diagram illustrating a transmitting device that performs ULIPDU transmission to a receiving device in a WHDI system.

The transmitting device that transmits ULIPDU includes a bitstream processor 81, an OFDM mapper 82, an uplink IDFT (downlink DFT) module 83, a CP inserter 84, a preamble MUX 85, a symbol shaper module 86, and an analog and RF module 87. Each element processes only data not audio data or video data. The data transmitted through the ULIPDU includes device ID (6 bytes value), ID of a device intended to seek, and vendor ID.

In an address system of WHDI, each device has its unique ID. Device ID is a MAC address of 6 bytes, which can identify each of all WHDI devices. Generally, if it is supposed that WHDI-HDMI bridge (adaptor) is a basic device, a device attached to the basic device is referred to as a sub device (for example, DVD, STB, Blueray, etc.), and 1 byte address called LSA (logical sub-address) is added to each sub device. If a network is connected with each WHDI device, 1 byte address called ANA (active network address) is added to each WHDI device. In this way, each device can be identified based on a device address system comprised of device ID, LSA, and ANA.

Figure 21:
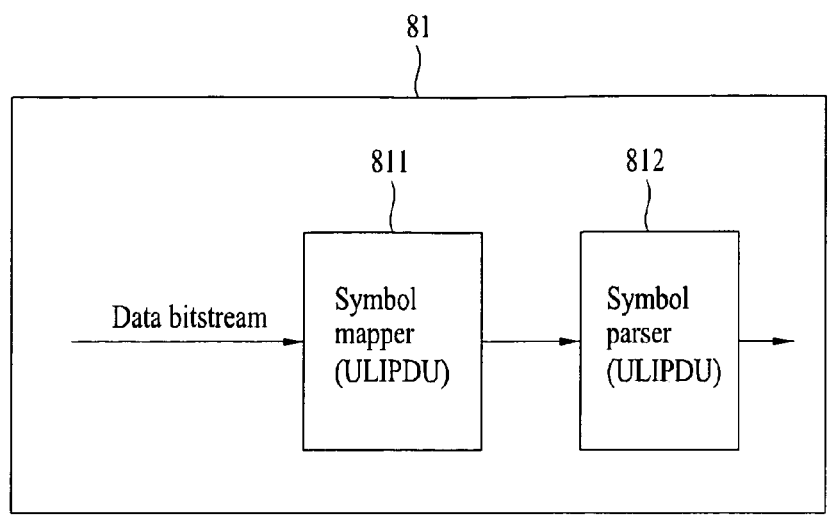
FIG. 21 is a diagram illustrating a bit stream processor of a transmitting device that performs ULIPDU transmission in a WHDI system.

FIG. 21 is a block diagram illustrating a bit stream processor of a transmitting device that performs ULIPDU transmission in a WHDI system.

Referring to FIG. 21, the ULIPDU bitstream processor 81 includes a symbol mapper 811 and a symbol parser 812. ULIPDU data modulation is performed by the symbol mapper 811 using on-off keying (OOK). For example, if one phase carrier is used, carrier scale (intensity) becomes 0 when an input bit is 0 and becomes Error! Objects cannot be created from editing field codes. when an input bit is 1. The modulated symbol (complex signal) is allocated to each OFDM symbol through the symbol parser 812. One OFDM symbol can allocate complex signal inputs equivalent to the number of subcarriers. The ULIPDU is transmitted to one spatial stream and one space time stream without using multi-antenna technology such as MIMO and STBC. The number of subcarriers of the ULIPDU OFDM is relatively smaller than that of subcarriers of DLPDU OFDM. This is because that a required data rate of a control signal is smaller than 1 Mbps as compared with a data rate of 200 Mbps or greater required for video data transmission of 1080p or greater. The OFDM mapper maps data complex valued symbols and pilots into appropriate subcarriers and OFDM symbols. The OFDM mapper 82 may also generate the pilots.

In the WHDI system, the ULIPDU DFT module 83 substantially has a function of DFT/IDFT, and operates as DFT during reception in the downlink while operates as IDFT during transmission in the uplink. Namely, based on the sink device, the ULIPDU DFT module 83 operates as IDFT during transmission while operates as DFT during reception.

The ULIPDU CP inserter 84 adds a cyclic period to a transmission procedure of a signal transformed by IDFT to avoid multi-path interference between OFDM symbols. The ULIPDU preamble MUX 85 performs multiplexing between the preamble field and all other (CES, DATA) fields, thus generating the ULIPDU. During the time designated for preamble field, the ULIPDU preamble MUX 85 selects as input the preamble, whereas during the time designated for CES and DATA fields, the ULIPDU preamble MUX 85 selects as input, the output of the OFDM modulator.

Figure 22:
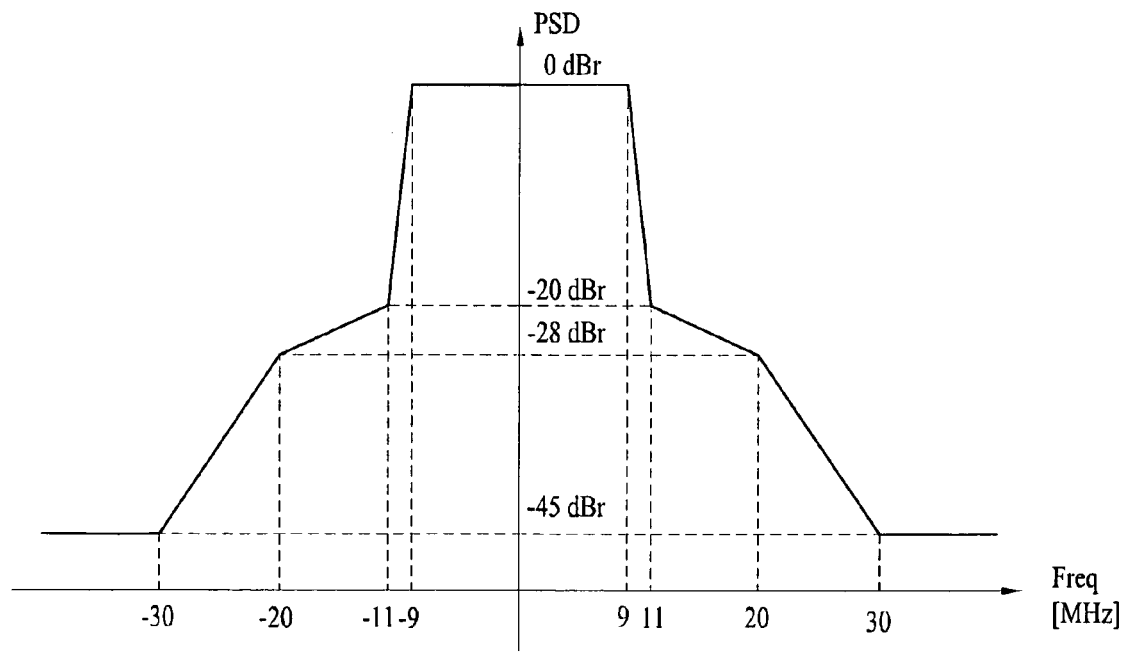
FIG. 22 is a diagram illustrating a transmission spectrum in case of 20 Mhz in a WHDI ULIPDU.

Afterwards, symbol shaping is performed by the ULIPDU symbol shaper module 86 such that the spectral requirements as defined in FIG. 22. FIG. 22 is a diagram illustrating a transmission spectrum in case of 20 Mhz in a WHDI ULIPDU.

Next, ULCPDU in the uplink will be described with reference to FIG. 23 to FIG. 25.

Generally, the PHY is designed to provide robustness and flexibility in order to support data rates of up to 100 kbps as well as for optimal operation in various home and office use case scenarios. This is achieved using various signal processing tools including OFDM modulation and frequency diversity. Two bandwidth modes, 20 MHz bandwidth mode and 40 MHz bandwidth mode can be used for PHY transmission. The two bandwidth modes are mandatory to supports for all WHDI devices.

In each bandwidth mode, shared medium and coexistence with other devices in the 5 GHz band is an important issue for maintaining high performance as well as avoiding interference to/from other systems. The ULCPDU modulation has been designed to coexist with existing devices. This coexistence is achieved by several means including carrier sense (CS), automatic frequency selection (AFS) and transmission power control (TPC).

The ULCPDU is an interval where the PHY for WHDI wireless transmission transmits data/control information from the sink device to the source device or the passive source device to the active source device using the uplink. Namely, the ULCPDU is a PHY signal sent, after the sink device receives the DLPDU from the active source device, from the sink device or the passive source device to another active source device, another sink device or another passive source device, to transfer the control message. The sink device or the passive source device fixes a channel and transmits the ULCPDU after finding the active source device.

Figure 23:
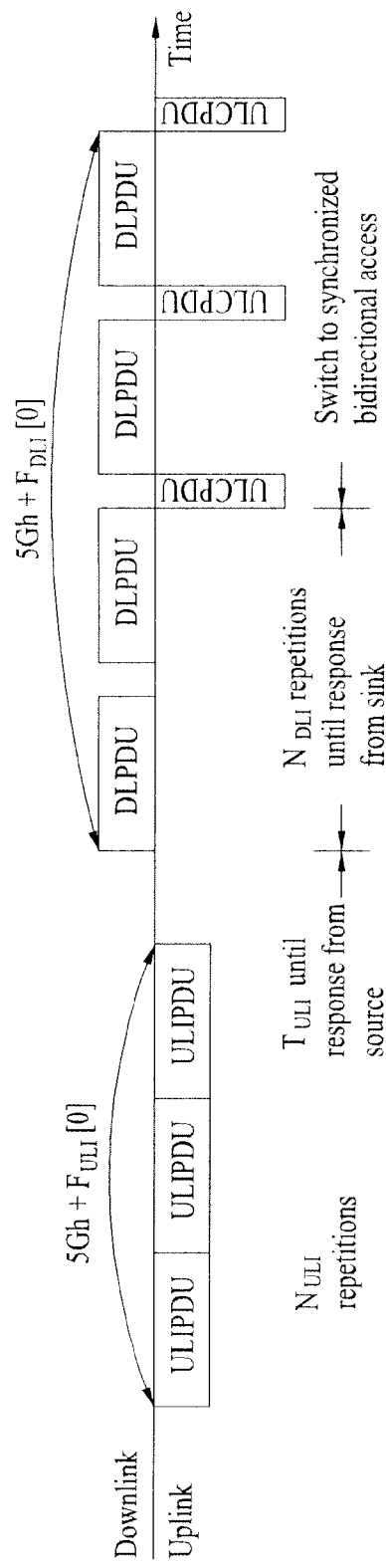
FIG. 23 is a diagram illustrating a video dependent timing relation between DLPDU and ULCPDU in a WHDI system, wherein PHY signal transmission in WHDI uses a bandwidth of 5 Ghz.

At this time, as illustrated in FIG. 23, ULCPDU transmission can be performed for a short time period between the DLPDU transmission intervals. FIG. 23 is a diagram illustrating a video dependent timing relation between DLPDU and ULCPDU in a WHDI system. As described above, PHY signal transmission in WHDI uses a bandwidth of 5 Ghz.

Figure 24:
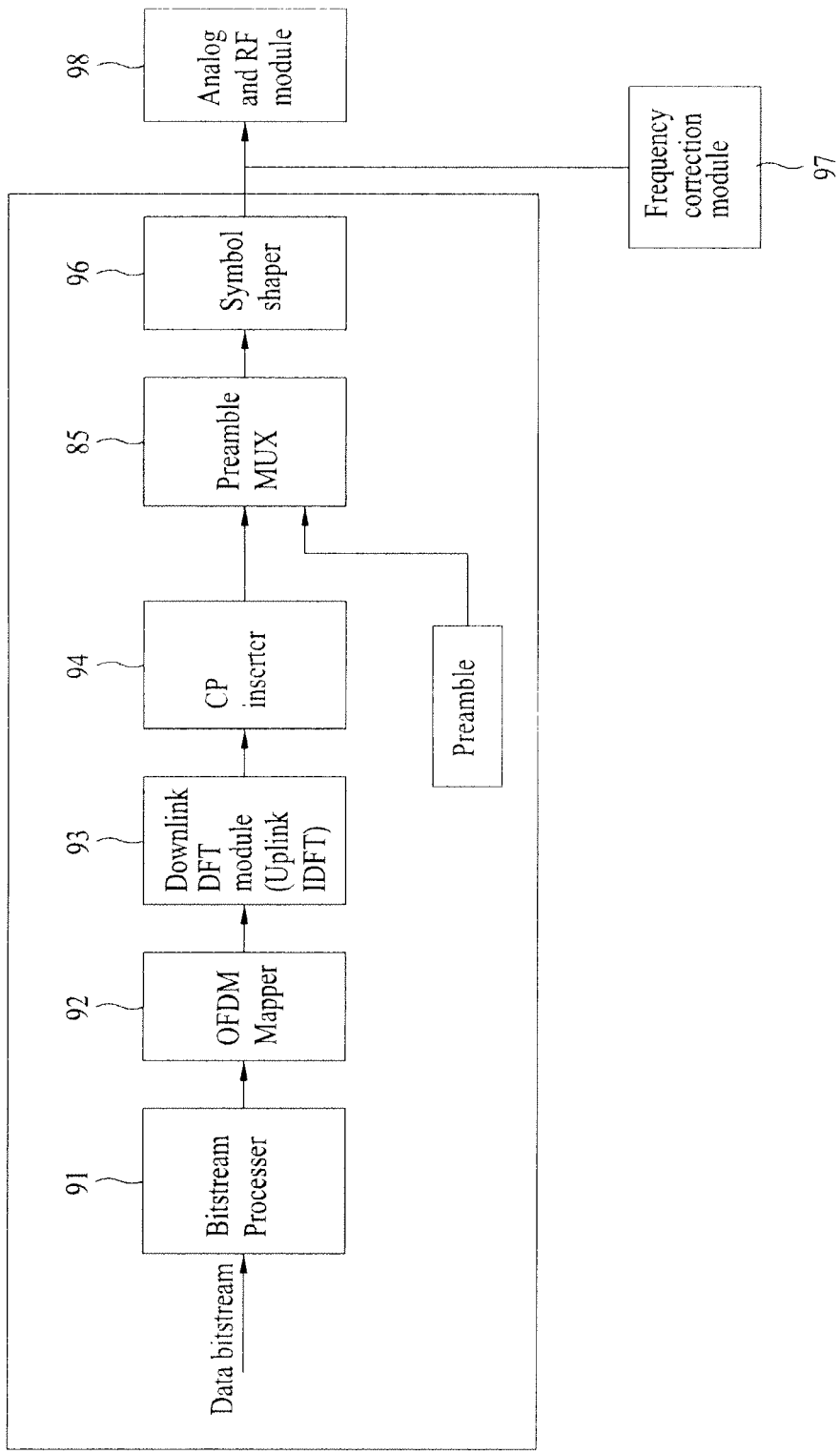
FIG. 24 is a block diagram illustrating a configuration of a ULCPDU transmitting device that transmits ULCPDU in a WHDI system.

FIG. 24 is a block diagram illustrating a configuration of a ULCPDU transmitting device that transmits ULCPDU in a WHDI system.

A reference implementation of the ULCPDU Baseband provides a reference for encoding the incoming control/data bitstream into an RF signal.

The ULCPDU transmitting device is similar to the aforementioned ULCPDU transmitting device of FIG. 21. Referring to FIG. 24, the ULCPDU transmitting device includes a bitstream processor 91 performing bitstream processing on the input data bitstream, an OFDM mapper 92 dividing the signals processed by the bitstream processor into pilots and data modulation symbols and mapping them into OFDM symbols, an uplink IDFT (downlink DFT) module 93 converting a block of constellation points to a time domain block, a cyclic prefix (CP) inserter 94 inserting the cyclic prefix to the modulated signal transmission, a preamble MUX 94 performing multiplexing between the preamble field and all other (CES, DATA) fields, a symbol shaper 96 performing symbol shaping on the time domain to comply with the spectral requirements, a frequency correction module 97 and an analog and RF module 98. Unlike the ULIPDU transmitting device, the frequency correction module 97 is only included in the ULCPDU transmitting device and performs frequency pre-correction to compensate for any frequency offsets between the transmitting device and the receiving device.

Figure 25:
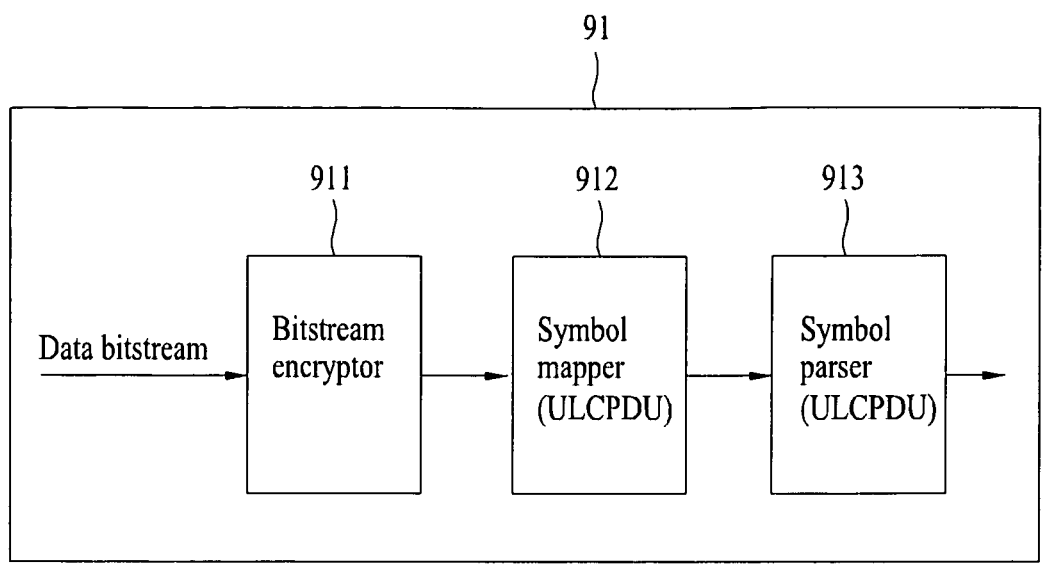
FIG. 25 is a block diagram illustrating a configuration of a bitstream processor in a ULCPDU transmitting device of a WHDI system.

Specifically, as illustrated in FIG. 25, the bitstream processor 91 includes a bitstream encryptor 911, a symbol mapper 912, and a symbol parser 913.

FIG. 25 is a block diagram illustrating a configuration of a bitstream processor in a ULCPDU transmitting device of a WHDI system.

The bitstream encryptor 911 encrypts data bitstreams in accordance with AES-128 CTR mode. The symbol mapper 912 modulates the encrypted data bitstreams into a plurality of symbols in accordance with on-off keying mode in the same manner as the ULIPDU transmitting device. Afterwards, the symbol parser 913 determines what OFDM symbol includes each symbol.

The frequency correction module 97 is implemented in only the ULCPDU transmitting device. Frequency correction shall be performed prior to the transmission of the ULCPDU through the analog and RF module 98 in order to compensate for any frequency offset between the ULCPDU transmitting device and a targeted ULCPDU receiver.

Frequency correction performed by the frequency correction module 97 is as follows.

$$\tilde{r}_{ULCPDU}(t) = \exp(j2\pi f_{cor} t) r_{ULCPDU}(t) \quad \text{[Math Figure 1]}$$

In the Equation 2, $f_{cor}$ shall be set by the MAC layer, and shall be estimated from DLPDUs received from the source device including the targeted ULCPDU receiver. Specifically, $f_{cor}$ shall be set such that the frequency offset between the ULCPDU transmitting device and the targeted ULCPDU receiver, after correction, is less than 1325 Hz. The analog and RF module 98 of the ULCPDU transmitting device can flexibly coordinate carrier frequency up to 1325 Hz depending on a receiving error occurring in the receiving side.

As described above, in the user devices belonging to the WHDI, the source device that transmits A/V signals and the sink device that receives the A/V signals have been described in detail. The aforementioned WHDI source device or the sink device is located in a part of the active network and is allocated with an active network address (ANA). The respective devices can be identified as one or more local modules, i.e., 'sub devices.' Each of the sub devices is allocated with local sub-address (LSA) within the device.

The WHDI device includes at least one sub device. For example, the WHDI source device may have a single sub device such as a DVD player, as a WHDI output module, or may have a single sub device such as a TV, as a WHDI input module.

Furthermore, the WHDI device includes a plurality of sub devices which are independent and controllable. For example, a cable WHDI bridge device connected to a plurality of cable source devices through A/V cable may be selected directly by a user through an 'input menu.' Alternatively, a sub device that can be controlled independently, like play, stop, and volume up/down of the device, may be used as the cable WHDI bridge device.

An example of the WHDI sub device includes a tuner device. The tuner device (for example, set top box, TV that can record broadcasting signals, etc.) is used for an input module of a wireless receiving device, and is a device that transmits only a specific electric wave selected by synchronizing with a frequency of an electrical signal or electric wave to a device. The tuner device includes a function that can receive broadcasting signals like set top box. The tuner device can be implemented in an internal type built in the WHDI device or an external type. The tuner device analyzes a radio signal received from a broadcasting station into an analog or digital signal and transmits the analyzed signal to the transmitting device, whereby the signal is output as moving picture on a display of the device. Also, the tuner device splits the received broadcasting signal into a video signal and caption information included in the video signal, displays the moving picture on the display through the video signal, and analyzes text included in the caption information, whereby the text is displayed with the moving picture.

Figure 26:
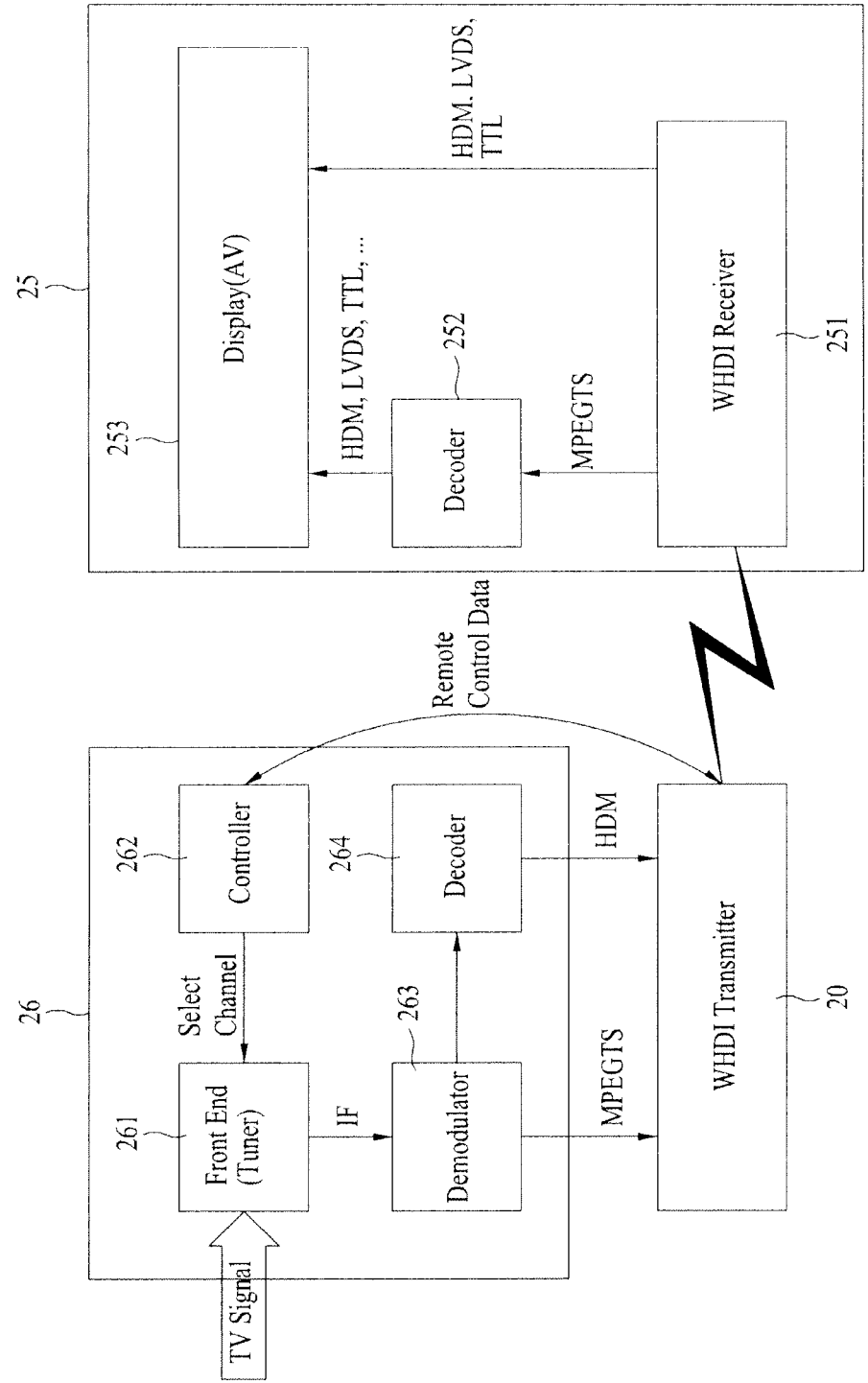
FIG. 26 is a block diagram illustrating a tuner device as an example of a sub device that can be implemented together with a WHDI transmitting device.

FIG. 26 is a block diagram illustrating a tuner device as an example of a sub device that can be implemented together with a WHDI transmitting device.

Referring to FIG. 26, a tuner device 26 is combined with a WHDI transmitting device 21. The tuner device 26 may be located outside the WHDI as shown in FIG. 26, or may be built in the transmitting device.

The tuner device 26 includes a tuner 261, a demodulator 263, a decoder 264, and a controller 262 controlling each element. If the tuner 261 is located at the front end of the transmitting device as shown in FIG. 26, it serves as the receiving module. The tuner 261 receives A/V signals only transmitted through a specific broadcasting channel selected by the user, and converts the received broadcasting signal into an intermediate frequency (IF) signal and then transfers the IF signal to the demodulator 263. The demodulator 263 demodulates the IF signal into a moving picture experts group (MPEG) transport stream and transfers the demodulated stream to the decoder 264. The decoder 264 recovers the A/V signals compressed with MPEG, and transfers the recovered A/V signals to the WHDI transmitting device 20 through an ordinary A/V bus such as HDMI (high-definition multimedia interface) used to transfer uncompressed signals. In this case, the decoder 264 can recover text data such as caption as well as a moving picture signal included in the compressed A/V signals. Accordingly, the transmitting device can overlay caption accompanied with the A/V signals on moving picture data while displaying the moving picture data through the recovered A/V signals transferred from the decoder.

At this time, the structure of the WHDI transmitting device is shown in FIG. 2, and if the recovered A/V signals are received from the tuner device, the demodulation module 202 and the decoding module 203 shown in FIG. 2 may not perform separate demodulation and decoding for the received A/V signals.

Also, if the transmitting device 20 transmits the A/V signals to the receiving device 25 and the decoder 252 is included in the receiving device 25, the tuner device can transmit the demodulated A/V signals to the WHDI transmitting device in an MPEG transport stream (TS) state without recovery. Then, the transmitting device 20 recovers the MPEG TS data from the decoder 203 of the transmitting device to display the received A/V signals. If the transmitting device transmits the corresponding signals to the receiving device, the receiving device recovers the demodulated A/V signals received through a WHDI receiver 251, i.e., the MPEG TS data from the decoder 252 and displays the recovered data in a display 253. Likewise, if the receiving device receives the A/V signals recovered by the tuner device from the transmitting device, the A/V signals are directly transferred from the WHDI receiver 251 to the display 253 without decoding, whereby moving pictures and caption can be displayed in the display 253.

In this case, the WHDI transmitting device and the receiving device transmit the MPEG TS data in an independent timing mode.

As described above, since the procedure of processing the A/V signals in the receiving device is varied depending on the operation of the tuner device of the transmitting device, the receiving device can previously request the transmitting device to provide tuner information. Generally, a request message requesting tuner information and a response message to the request message can be exchanged through the AVCL message.

Figure 27:
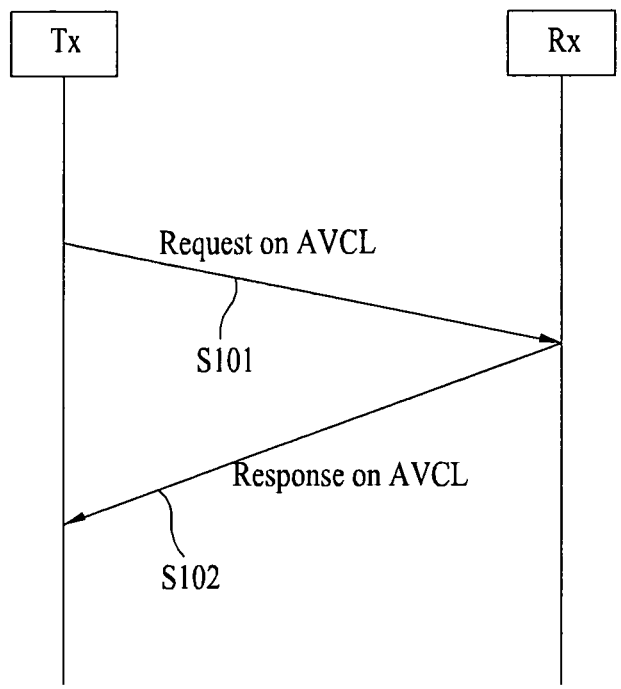
FIG. 27 in a diagram illustrating a process of exchanging AVCL command and a response message to the AVCL command between a transmitting device and a receiving device in a WHDI.

FIG. 27 in a diagram illustrating a process of exchanging AVCL command and a response message to the AVCL command between a transmitting device and a receiving device in a WHDI.

Referring to FIG. 27, the transmitting device transmits AVCL message or command to the receiving device prior to connection with the receiving device for streaming of A/V signals (S101). Referring to FIG. 3, the AVCL message or command is generated by the AVCL 32 of the transmitting device.

The AVCL command message transmitted through the transmitting device can include elements expressed in Table 1.

TABLE 1

| Field Name | Description | Size | Value |
| --- | --- | --- | --- |
| Initiator_Addr | Initiator_AVCL_Address | 2 Bytes | Byte 0: Initiator Device_ANA Byte 1: Initiator Device LSA |
| Follower_Addr | Follower AVCL_Address | 2 Bytes | Byte 0: Follower Device_ANA Byte 1: Follower Device_LSA |
| AVCL Opcode | Opcode | 1 Bytes | |
| AVCL_Parameter | Parameter(s) specific to opcode(Optional, depending on opcode) | Depends on Opcode | |

Referring to Table 1, one AVCL command includes a transmitting device address (Initiator_Addr), a receiving device address (Follower_Addr), AVCL_Opcode, and an AVCL parameter as Identifier. One or more devices included in the WHDI network should be identified. Accordingly, in order to match the aforementioned device address system, bits indicating the transmitting device address and the receiving device address should be provided additionally. The transmitting device address (Initiator_Addr) is an address of a transmitting device that transmits AVCL command, and has a size of 2 bytes with 1 byte indicating ANA (address given by active source device when the transmitting device is the active source device) and 1 byte indicating LSA. The receiving device address (Follower_Addr) is a network address of a receiving device that receives AVCL command, and has a size of 2 bytes with 1 byte indicating ANA and 1 byte indicating LSA.

AVCL_Opcode represents a message type, and represents various commands as listed in Table 2.

TABLE 2

| Command Opcode | Opcode Value |
|---|---|
| <Action Reject> | 0x01 |
| <Action Accept> | 0x02 |
| <Wait> | 0x03 |
| <Echo Request> | 0x04 |
| <Echo Report> | 0x05 |
| <Get LSAs> | 0x06 |
| <Report LSAs> | 0x07 |
| <Get LSA from OSD Name> | 0x08 |
| <Report LSA from OSD Name> | 0x09 |
| <Active Stream Source> | 0x0A |
| <Inactive Stream Source> | 0x0B |
| <Set Active Stream Source> | 0x0C |
| <Request Active Stream Source> | 0x0D |
| <Switch Stream Source> | 0x0E |
| <AV Status> | 0x0F |
| <Get AV Status> | 0x010 |
| <Image View On> | 0x011 |
| <Text View On> | 0x012 |
| <Menu Request> | 0x13 |
| <Menu Status> | 0x14 |
| <Device Setup> | 0x15 |
| <Record On> | 0x16 |
| <Record Off> | 0x17 |
| <Record Status> | 0x18 |
| <Record Display> | 0x19 |
| <Clear Analog Timer> | 0x1A |
| <Clear Digital Timer> | 0x1B |
| <Set Analog Timer> | 0x1C |
| <Set Digital Timer> | 0x1D |
| <Timer Cleared Status> | 0x1E |
| <Timer Status> | 0x1F |
| <User Control Pressed> | 0x20 |
| <User Control Released> | 0x21 |
| <User Control Still Pressed> | 0x22 |
| <Standby> | 0x23 |
| <EDID Request> | 0x24 |
| <EDID Status> | 0x25 |
| <EDID Report> | 0x26 |
| <Get Subdevice Information> | 0x27 |
| <Report Subdevice Information> | 0x28 |
| <Set Subdevice OSD Name> | 0x29 |
| <Give Deck Status> | 0x2A |
| <Deck Status> | 0x2B |
| <Deck Control> | 0x2C |
| <Play> | 0x2D |
| <Give Tuner Device Status> | 0x2E |
| <Tuner Device Status> | 0x2F |
| <Select Analog Service> | 0x30 |
| <Select Digital Service> | 0x31 |
| <Tuner Step Decrement> | 0x32 |
| <Tuner Step Increment> | 0x33 |
| <Vendor Command> | 0x34 |
| <System Audio Mode Request> | 0x35 |
| <System Audio Mode> | 0x36 |
| <Audio Control> | 0x37 |
| <Give Audio Volume> | 0x38 |
| <Report Audio Volume> | 0x39 |
| <Set Audio Delay> | 0x3A |
| <Audio Delay> | 0x3B |
| <Get Audio Delay> | 0x3C |
| <Present OSD String> | 0x3D |
| <Present OSD Menu> | 0x3E |
| <OSD Menu Current Selection> | 0x3F |
| <OSD Menu Final Selection> | 0x40 |
| <Present OSD Text Request> | 0x41 |
| <OSD Text Response> | 0x42 |
| <Get OSD Language> | 0x43 |
| <Report OSD Language> | 0x44 |

TABLE 2-continued

| Command Opcode | Opcode Value |
|---|---|
| <Test> | 0x45 |
| Reserved | 0x0, 0x46 to 0xFF |

Referring to Table 2, various types of AVCL messages can be exchanged between the transmitting device and the receiving device. In this case, 'command opcode' is AVCL_Opcode, and represents a command requesting specific action from the transmitting device to the receiving device or vice versa and a response message to the command, respectively.

In FIG. 27, when the AVCL command transmitted in step S101 is a command that requires an action, the receiving device which has received the command transmits a response message to the transmitting device, wherein the response message indicates whether the receiving device can perform the requested action (S102). For example, if the receiving device cannot perform the requested action or is not ready for the action, it transmits the response message to the transmitting device. At this time, AVCL-Opcode of the transmitted response message represents action reject message among a plurality of commands illustrated in Table 2. Generally, examples of the response message include an action reject message, an action accept message, and a wait message.

Meanwhile, the AVCL command illustrated in Table 2 is not processed by all devices. Processing of the AVCL command may be performed or omitted depending on implementation of the device. For example, if the receiving device which has received A/V data transmits a 'Give Tuner Device Status' message requesting status information of the tuner device included in the transmitting device, the transmitting device which has received the message may not implement a processor that can generate a 'Tuner Device Status (Opcode=0x2F)' message. In this case, the transmitting device cannot transmit a response message to the AVCL request message of the receiving device. Accordingly, in order to be ready for retransmission of the corresponding AVCL message due to omission of the response message to the AVCL message, the receiving device can transmit 'Test' command before transmitting the AVCL command to the tuner device. The 'Test' command is a specific command for previously testing whether the processor of the AVCL message intended to be requested from the receiving device is implemented. In Table 1, the 'Test' command has an AVCL_Opcode field of 0x45 and an AVCL_parameter field of 1 Byte, and includes corresponding Opcode for testing whether the processor of the AVCL message is implemented in the WHDI receiving device.

The receiving device which has received the 'Test' command transmits an action accept message to the transmitting device if the processor of the corresponding command is implemented. The receiving device transmits an action reject message to the transmitting device if not so. Accordingly, the transmitting device can prevent an unavailable response message from repeatedly transmitting to the receiving device.

The AVCL message requesting specific action may also be exchanged between the sub devices or between the sub device and the device.

Generally, the WHDI device can request the sub device to provide a command such as 'Get Subdevice Information'. The sub device can represent respective kinds of performance, and has a subdevice capability data structure indicating each kind of performance. A total of 2 bytes are allocated to represent subdevice capability data, wherein each bit of the corresponding bytes represents various kinds of performance of the sub device. In this case, if the nth bit is set to 1, corresponding performance is implemented in the sub device. If a performance bit of the tuner device is set to 1 in the subdevice capability data structure, the tuner device can implement tuner control feature and tuner control category remote control keys.

Accordingly, the receiving device which receives the A/V signals from the transmitting device can transmit the AVCL message to the transmitting device to request the status of the tuner device. To this end, the AVCL message can include an information request message of the tuner device which is an example of the sub device.

Generally, examples of the AVCL command for controlling the tuner device, as illustrated in Table 2, include a 'Give Tuner Device Status' command requesting status information of the tuner device, a 'Tuner Device Status' command indicating the status of the current tuner device as a response message to the request message, a 'Select Analog Service' command requesting analog broadcasting, a 'Select Digital Service' command requesting digital broadcasting, a 'Tuner Step Decrement' command, and a 'Tuner Step Increment' command, wherein the 'Tuner Step Decrement' command and the 'Tuner Step Increment' command moves up/down a recorded channel. Table 3 illustrates the AVCL command for controlling the tuner device.

source device, or a passive source device on the active network. The 'Select Analog Service' command and the 'Select Digital Service' command are used to request service conversion of the tuner device to analog or digital broadcasting. The 'Tuner Step Decrement' command and the 'Tuner Step Increment' command are used to request a channel to be moved up/down so that the tuner device selects a specific channel from a channel list that provides a service. The tuner device which has received any one of 'Select Analog Service' command, the 'Select Digital Service' command, the 'Tuner Step Decrement' command, and the 'Tuner Step Increment' command follows the corresponding command or transmits the 'Action Reject' message and an error code indicating the reason of the 'Action Reject' message if it does not follow the corresponding command. As described above, among various AVCL messages transmitted to the sub device, in respect of the message requesting the status of the tuner device and its response message, a message exchange type between devices will be described.

A method of controlling a device according to one embodiment of the present invention is intended that the tuner device transfers its status information together with caption information in accordance with a request of the receiving device. Particularly, as the tuner device transfers its caption informa-

TABLE 3

| Command Opcode | Params | Param Length [Bytes] | Prams Option | Addressing | Response |
|---|---|---|---|---|---|
| <Give Tuner Device Status> | [Mode] | 1 | 0x00 - Off<br>0x01 - On<br>0x02 - Once<br>0x03 to 0xFF - Reserved | Initiator: Any subdevice Follower: Tuner source subdevice | <Tuner Device Status> |
| <Tuner Device Status> | [Recording Flag] | 1 bit | 0-Not being used for recording<br>1-Being used for recording | Initiator and Follower swaped from <Get Tuner Device Status> | No response |
|  | [Device Source] | 1 bit | 0-Displaying Tuner<br>1-Not displaying Tuner |  |  |
|  | [Tuner Type] | 1 bit | 0-Analog Tuner<br>1-Digital Tuner |  |  |
|  | [Captions] | 1 bit | 0-Captions are not embedded in the video stream or unknown<br>1-Captions are embedded in the video stream |  |  |
|  | [Reserved]<br>[Analog Tuner Information]<br>[Digital Tuner Information] | 4 bits | Shall be 0. |  |  |
| <Select Analog Service> | [Analog Tuner Information] | 4 |  | Initiator: Any subdevice Follower: Tuner source subdevice | No response or <Action Reject> |
| <Select Digital Service> | [Digital Tuner Information] | 7 or 5 |  |  |  |
| <Tuner Step Decrement> |  | N/A | N/A |  |  |
| <Tuner Step Increment> |  | N/A | N/A |  |  |

Referring to Table 3, the 'Give Tuner Device Status' command is a message for requesting the current status of the tuner device, wherein the tuner device could be an active tion to the display sub device attached to the receiving device, the user can identify status information of the tuner device included in the transmitting device.

Figure 28:
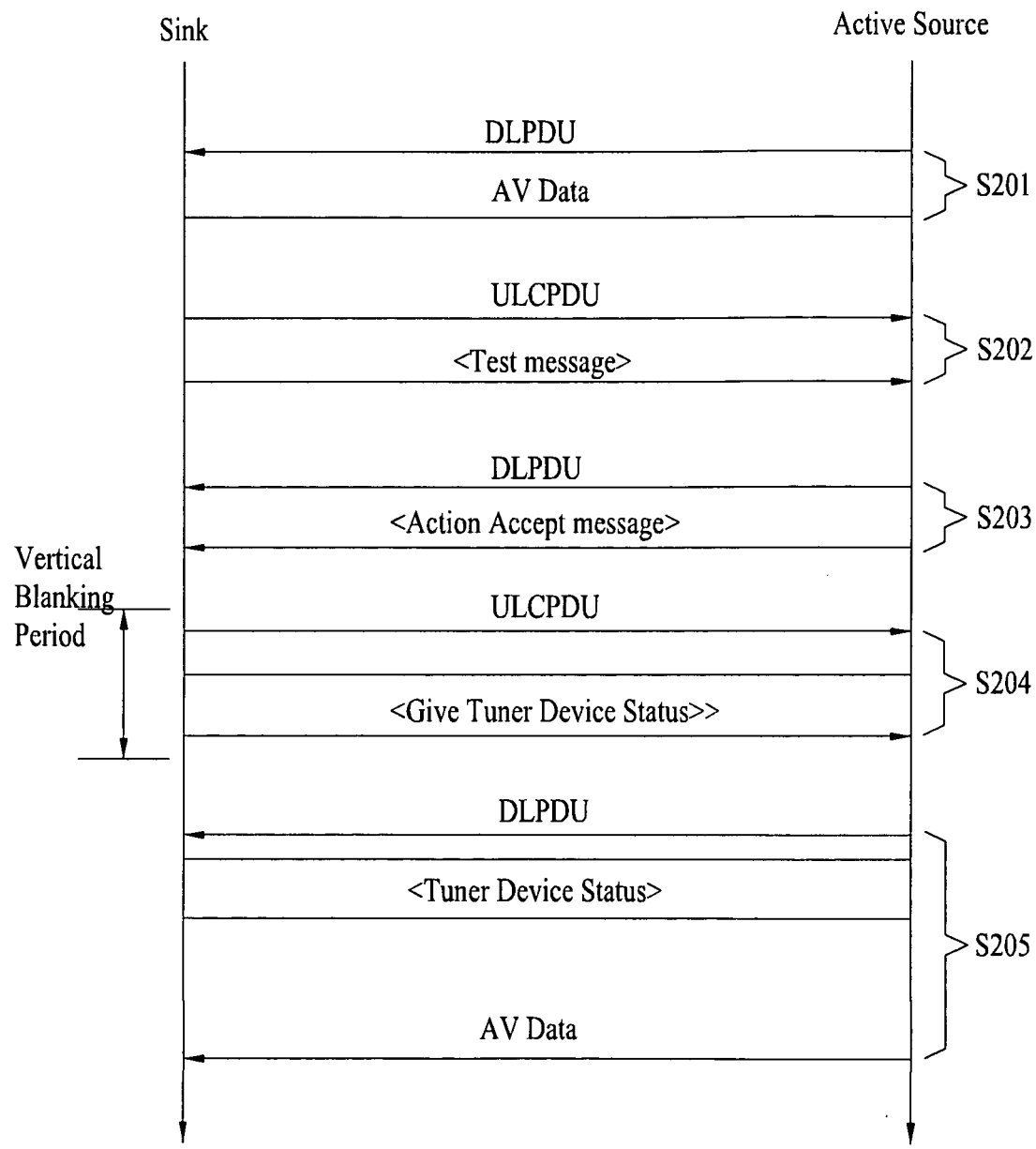
FIG. 28 is a flow chart illustrating an example of a process of exchanging AVCL message between WHDI devices in accordance with one embodiment of the present invention.

FIG. 28 is a flow chart illustrating an example of a process of exchanging AVCL message between WHDI devices in accordance with one embodiment of the present invention.

Specifically, FIG. 28 illustrates a procedure of exchanging a status message of a tuner device between a WHDI receiving device and a transmitting device.

Although a sink device is shown as an example of the receiving device and a tuner device is shown as an example of the transmitting device in FIG. 28, since the tuner device is a lower concept of a source device, the source device includes the tuner device.

Referring to FIG. 28, the sink device that receives A/V signals from the tuner device through the DLPDU (S201) transmits a tuner information request message, i.e., 'Give Tuner Device Status' message to the tuner device to request current status information of the tuner device. In this case, the receiving device transmits a test message to the tuner device, wherein the test message is to test whether a response to the corresponding request message can be obtained (S202). The test message is a message requesting whether a tuner device status message desired by the receiving device to receive from the tuner device can be processed, and is transmitted by being encapsulated in the ULCPDU. When an AVCL_Parameter field of the test message is coincident with Opcode of the AVCL message to be requested, the device can exchange the AVCL message related to the tuner device by receiving an action accept message of the corresponding message.

If the tuner device which has received the test message implements a processor processing the tuner device status message, it transmits the action accept message to the receiving device (S203). The action accept message transmitted from the tuner device to the receiving device is transmitted by being encapsulated in the DLPDU. Accordingly, the receiving device can transmit a response message by transmitting the AVCL message requesting status information of the tuner device to the tuner device.

Next, the receiving device transmits a tuner information request message, i.e., Give Tuner Device Status message to the tuner device through the ULCPDU (S204). The tuner device which has received the request message transmits a response message, i.e., Tuner Device Status message including the status of the active source device and the tuner device to the sink device in response to the request message (S205). At this time, MAC message including the AVCL message is transmitted from the tuner device to the sink device by being encapsulated in the DLPDU.

The Give Tuner Device Status message can be included in the UCLPDU transmitted for a 'Vertical Blanking Period' corresponding to a period prior to transmission of the n+1th DLPDU after transmission of the nth DLPDU when the tuner device is, for example, in a video independent DLPDU mode where the tuner device synchronizes its frequency with a video signal to transmit the video signal. At this time, the AVCL message, i.e., Give Tuner Device Status message and the response message are transmitted by being encapsulated in the MAC message. The MAC message will be described with reference to FIG. 29.

Figures 29, 30:
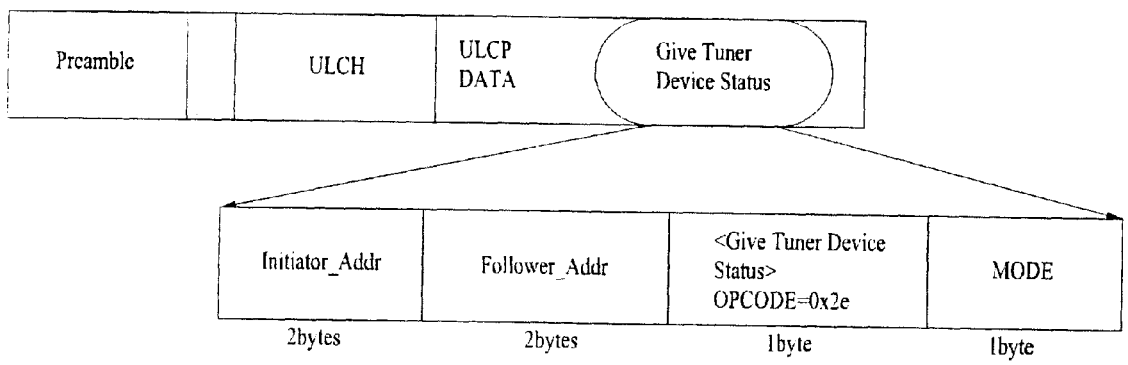
FIG. 29 is a diagram illustrating an example of a MAC message format generated by a MAC layer of a WHDI device.
FIG. 30 is a diagram illustrating an example of an AVCL message format transmitted from a WHDI device through ULCPDU in accordance with one embodiment of the present invention.

FIG. 29 is a diagram illustrating an example of a MAC message format generated in a MAC layer of a WHDI device.

The MAC message can be divided into a short MAC message and a long MAC message depending on whether the message includes a Null field. The MAC message illustrated in FIG. 29 is a short MAC message excluding the Null field. The Null field is a region allocated to transmit a Null message, and has a length of 1 byte and a value of 0x00.

Referring to FIG. 29, the short MAC message includes a MAC message preamble of 2 bytes of 16-bits length, a bit indicating MAC message type of 2 bytes, a MAC message length of 1 byte, a MAC message body of various lengths, and a message check sequence (MCS) field of 16 bits including cyclic redundancy check (CRC) of 16 bits. In this case, a reliable message has a value indicating a unique MAC message type in a message type field. The MAC message body field can use various lengths from 1 bit to 254 bits depending on the type of the AVCL command. Namely, when the AVCL command is transmitted from the transmitting device to the receiving device or vice versa, the AVCL command is included in the MAC body field. According to the embodiment of the present invention, the echo request message is included in the MAC body field.

According to one embodiment of the present invention, the Give Tuner Device Status message, which is a kind of the AVCL command, and its response message are also included in the MAC body field. A record on message requesting a record function setting of the source device and a record status message are also included in the MAC body field.

The MCS field can be calculated on all fields of the MAC message excluding message preamble field, message type message length, and message body field. The long MAC message includes the Null field.

As described above, if the Give Tuner Device Status message which is a kind of the AVCL command is transmitted, the MAC message including the Give Tuner Device Status message generated by the AVCL 32 of the sink device is transferred to the PHY layer 34 and then transmitted to the tuner device through the ULCPDU. Likewise, if the response message to the Give Tuner Device Status message which is a kind of the AVCL command is transmitted, the MAC message including the response message generated by the AVCL 32 of the tuner device is transferred to the PHY layer 34 and then transmitted to the sink device through the DLPDU.

FIG. 30 is a diagram illustrating an example of an AVCL message format transmitted from a WHDI device through ULCPDU in accordance with one embodiment of the present invention.

The sink device that receives A/V data from the WHDI active source device transmits the MAC message including the AVCL command to the tuner device or the source device to request status information of the tuner device. At this time, the MAC message is included in the ULCPDU.

Referring to FIG. 30, the ULCPDU format includes a preamble, an uplink control header (ULCH), and a ULCP data filed transmitting data/control bitstreams. The Give Tuner Device Status message requesting status information of the tuner device is included in the ULCP data field.

Examples of the Give Tuner Device Status message format included in the ULCP data field include an Initiator_Addr field indicating an address (including ANA and LSA addresses) of a device that transmits a corresponding message, a Follower_Addr field indicating an address (including ANA and LSA addresses) of a device that receives the corresponding message, and a Command_Opcode field defining a message to be transmitted. 2 byte is allocated to each field. The size of the allocated data is an example for describing the present invention, and the present invention is not limited to such example.

A Mode field designates a response mode of the response message transmitted from the device that receives the AVCL request message, and includes a total of three modes. 1 byte can be allocated to the Mode field. For example, if 0x00 is set to the Mode field, it requests that the WHDI transmitting device should not transmit the response message (Tuner Device Status). If 0x01 is set to the Mode field, it requests that the WHDI transmitting device should continuously transmit the response message even without request of the receiving device whenever the status of the tuner device is changed. If 0x02 is set to the Mode field, it requests that the WHDI transmitting device requests should transmit the response message to the AVCL request message once if the AVCL request message is received.

Since transmission through the ULCPDU is based on data having no relation with A/V data, the AVCL command is modulated to a radio signal by the bitstream processor 81 without multiplexing with A/V data as illustrated in FIG. 20. The data bitstreams including the modulated response message are mapped into OFDM symbols through the OFDM mapper 82, go through the IDFT module 83, are symbolized in a state that preamble is added thereto by the preamble MUX 85, and are transmitted to the source device through the RF module 87.

The tuner device receives the ULCPDU including the AVCL command transmitted from the sink device through its PHY layer 34, and transfers the AVCL command to the AVCL 32 through the MAC layer 33, wherein the AVCL command includes the Give Tuner Device Status message. The AVCL 32 of the tuner device generates a response message in response to the Give Tuner Device Status message received from the sink device. The tuner device transmits the response message included in the DLPDU to the sink device, which will be described with reference to FIG. 31.

Figure 31:
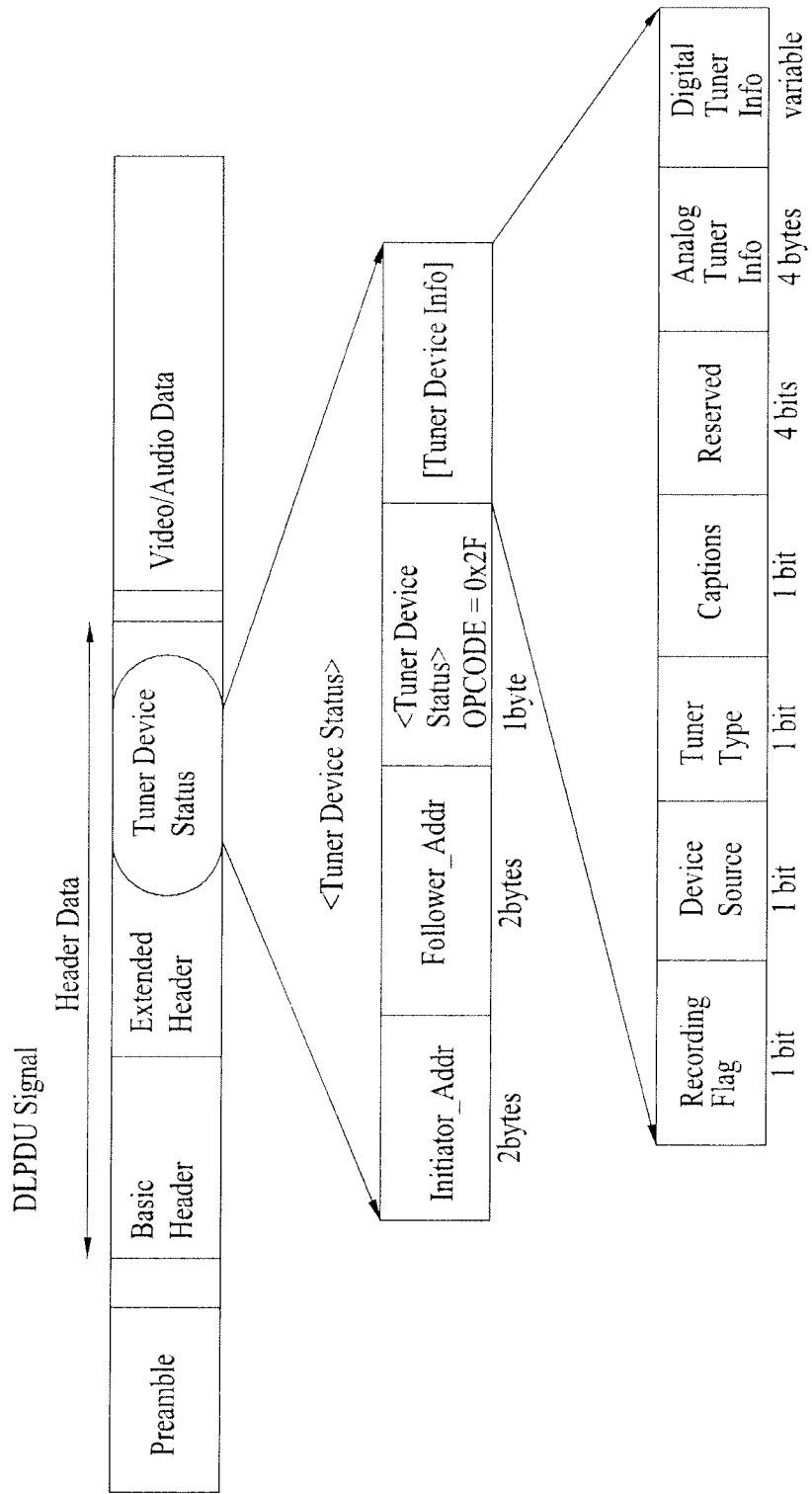
FIG. 31 is a diagram illustrating an example of an AVCL message format transmitted from a WHDI device through DLPDU in accordance with one embodiment of the present invention.

FIG. 31 is a diagram illustrating an example of an AVCL message format transmitted from a WHDI device through DLPDU in accordance with one embodiment of the present invention. The tuner device transmits a MAC message including AVCL command to the sink device through the DLPDU. Likewise, the source device transmits the AVCL command to the sink device through the DLPDU.

Referring to FIG. 31, the DLPDU includes a preamble, a basic header, an extended header, and an interval for transmitting A/V data. In this case, the AVCL response message (Tuner Device Status) transmitted from the tuner device in accordance with an example of the present invention is included in the extended header of the DLPDU. The region to which the response message is transmitted includes an Initiator_Addr field indicating an address of the tuner device that transmits a response message, a Follower_Addr field indicating an address of the sink device that receives the response message, and a Command_Opcode field indicating the corresponding message.

A 'Tuner Device Info' parameter that includes information of the tuner device, as illustrated in Table 3, includes a 'Recording Flag' parameter indicating whether the tuner device is recording a corresponding channel, a 'Device Source' parameter indicating whether the tuner device is currently being used, a 'Tuner Type' parameter indicating a type of the tuner device, and a 'Caption' parameter indicating whether caption decoding is performed. 1 bit can be allocated to each parameter. Also, the 'Tuner Device Info' parameter can include an 'Analog Tuner Info' parameter and a 'Digital Tuner Info' parameter, wherein the 'Analog Tuner Info' parameter includes information of an analog tuner device and the 'Digital Tuner Info' parameter includes information of a digital tuner device.

Referring to Table 3, if the 'Recording Flag' parameter has a value of 1, it indicates that the corresponding tuner device is recording a specific channel. If the 'Recording Flag' parameter has a value of 0, it indicates that the corresponding tuner device is not recording a specific channel. If the 'Device Source' parameter has a value of 0, it indicates that the tuner device is used as an input port of the transmitting device. If the 'Device Source' parameter has a value of 1, it indicates that other external input device (for example, HDMI, RGB, component) is selected. If the 'Tuner Type' parameter has a value of 0, it indicates that the current tuner device acts as the analog tuner. If the 'Tuner Type' parameter has a value of 1, it indicates that the current tuner device acts as the digital tuner. The 'Caption' parameter indicates whether the tuner device outputs video streams that include text data streams corresponding to caption information. If the 'Caption' parameter has a value of 0, it indicates that the caption streams are not included in the video streams or cannot be identified. If the 'Caption' parameter has a value of 1, it indicates that the caption streams are included in the video streams. Accordingly, if the 'Caption' parameter has a value of 1, the caption streams included in the video streams are split when they are decoded by the tuner device while the caption streams are overlaid on the same screen when the corresponding video streams are displayed. Additionally, a reserved field that can be used for data transmission may be provided.

The 'Caption' parameter indicates whether the transmitting device can display the status of the tuner device using text data to allow the user of the sink device to identify the status of the tuner device, while transmitting the response message (Tuner Device Status) to the receiving device that requests status information of the tuner device. Even in the case that the transmitting device transmits a response message to another request message for controlling the tuner device as well as the response message indicating the status of the tuner device as described in the aforementioned embodiment, the 'Tuner Device Info' parameter can include the 'Caption' parameter.

The 'Analog Tuner Info' parameter and the 'Digital Tuner Info' parameter will be described with reference to Table 4 and Table 5.

TABLE 4

| Command_Opcode | Params | Params Length [Bytes] | Params Options |
|---|---|---|---|
| <Tuner Device Status> | [Analog Tuner Information] | | |
|  | [Analog Broadcast Type] | 1 | 0x00 - Cable<br>0x01 - Satellite<br>0x02 - Terrestrial<br>0x03 to 0xFF - reserved |
|  | [Analog Frequency] | 2 | N x 62.5 KHz,<br>0x0000 < N < 0xFFFF |
|  | [Broadcast System] | 1 | 0x00 - PAL B/G<br>0x01 - SECAM L<br>0x02 - PAL M<br>0x03 - NTSC M<br>0x04 - PAL I<br>0x05 - SECAM DK<br>0x06 - SECAM B/G<br>0x07 - SECAM L<br>0x08 - PAL DK<br>0x09 - 0x1E - reserved<br>0x1F - Other system<br>0x32 to 0xFF - reserved |

Table 4 illustrates a structure of the 'Analog Tuner Info' parameter included in the 'Tuner Device Status' message indicating status information of the tuner device.

Referring to Table 4, an 'Analog Broadcast Type' parameter is allocated with 1 byte and indicates information to which an analog broadcasting signal belongs among a cable signal, a satellite signal, and a terrestrial signal. An 'Analog Frequency' parameter indicates channel information of 62.5 KHz as analog channel information, and a 'Broadcast System' parameter indicates information of the broadcasting standard for each station, such as PAL and NTSC.

Table 5 illustrates a structure of the 'Digital Tuner Info' parameter included in the 'Tuner Device Status' message indicating status information of the tuner device.

TABLE 5

| Command_Opcode | Params | Params Length [Bytes] | Params Options |
|---|---|---|---|
| <Tuner Device Status> | | | [Digital Tuner Information] |
| | [Service Identification Method] | 1 bit | 0 - Service identified by Digital IDs<br>1 - Service identified by channel |
| | [Digital Broadcast System] | 7 bits | 0x00 - ARIB generic<br>0x01 - ATSC generic<br>0x02 - DVB generic<br>0x08 - ARIB-BS<br>0x09 - ARIB-CS<br>0x0A - ARIB-T<br>0x10 - ATSC Cable<br>0x11 - ATSC Satellite<br>0x12 - ATSC Terrestrial<br>0x18 - DVB-C<br>0x19 - DVB-S<br>0x1A - DVB S2<br>0x1B - DVB-T<br>Other values are reserved |
| | If [Service Identification Method] = 0, [Digital Broadcast System] = ARIB | | |
| | [Transport Stream ID] | 2 | |
| | [Service ID] | 2 | |
| | [Original Network ID] | 2 | |
| | If [Service Identification Method] = 0, [Digital Broadcast System] = ATSC | | |
| | [Transport Stream ID] | 2 | |
| | [Program Number] | 2 | |
| | Reserved | 2 | 0x0000 |
| | If [Service Identification Method] = 0, [Digital Broadcast System] = DVB | | |
| | [Transport Stream ID] | 2 | |
| | [Service ID] | 2 | |
| | [Original Network ID] | 2 | The original_network_ID of the network carrying the transport stream for the required service |
| | If [Service Identification Method] = 1 | | |
| | [Channel Number Format] | 6 bits | 0x01 - 1-part channel number<br>0x02 - 2-part channel number<br>0x03 to 0x3F - reserved |
| | [Major Channel Number] | 10 bits | If [Channel Number Format] is "2-part Channel Number", this operand represents a 3-digit Major channel number in hexadecimal format;<br>if [Channel Number Format] is "1-part Channel Number", this operand shall be ignored. |
| | [Minor Channel Number] | 16 bits | If [Channel Number Format] is "1-part Channel Number"this operand represents a 1-part Channel Number in hexadecimal format;<br>If [Channel Number Format] is "1-part Channel Number", this operand represents a Minor channel number in hexadecimal format |

Referring to Table 5, a 'Service Identification Method' parameter included in the 'Digital Tuner Info' parameter indicates whether a reference of digital broadcast identification is digital service ID or channel number. A 'Digital Broadcast System' parameter indicates the standard for each nation, such as ATSC and DVB, in a digital broadcast system. A 'Transport Stream ID' parameter included in the digital broadcasting signal indicates ID information of a transport stream header of MPEG2 that provides a requested service. 'Transport Stream ID', 'Service ID', 'Original Network ID', etc. are respectively split when the current broadcast system is ATSC, DVB or ARIB. The 'Original Network ID' indicates original network ID of a network that transfers transport streams to provide a requested service.

Referring to FIG. 9, the response message indicating status information of the tuner device including the aforementioned parameter is multiplexed into one bitstream by the bit stream MUX 73 together with data/control bitstreams which are not encoded, test bit streams, audio bitstreams which are encoded, and video coarse bitstreams. Namely, the response message is transmitted to the sink device together with other bitstreams through multiplexing, encryption, and modulation in the WHDI PHY.

Unlike FIG. 31, the MAC message that includes the response message can be transmitted from the data field that transmits data/control bitstreams of the DLPDU. At this time, the response message is included in the control bitstreams.

Meanwhile, message exchange including AVCL command for requesting A/V data streams between WHDI devices can be used even for control of other function.

For example, a display device that receives A/V data from a WHDI device or a base station and displays the A/V data can include a record on message and a record off message in the AVCL command exchanged between devices to perform a record function. A One Touch Record (OTR) function allows the user to record video materials displayed in an output device such as TV. Generally, the user can implement a record function by directly pushing an 'OTR button' through physical pressure, remotely controlling the display device, or using a remote controller of the device.

Examples of the AVCL command for implementing the OTR function include a Give Tuner Device Status message, a Tuner Device Status message, a Record on message, a Record off message, a Record status message, and a Record display message, as illustrated in Table 6.

TABLE 6

| Command Opcode | Params | Params Length [Bytes] | Param Options | Addressing | Response |
|---|---|---|---|---|---|
| <Record On> | [Record Source] | 1 | 0x01 - Own Source<br>0x02 - Digital service<br>0x03 - Analog service | Display to recording device | <Record Status> or |

TABLE 6-continued

| Command Opcode | Params | Params Length [Bytes] | Param Options | Addressing | Response |
|---|---|---|---|---|---|
| | [Analog/Digital Tuner Information] | | 0x00, 0x04 to 0xFF - reserved | | <Action Reject> |
| <Record Off> | None | N/A | N/A | Display to recording device | No response |
| <Record Status> | [Record status info] | 1 | 0x01 - Recording own source<br>0x02 - Recording digital service<br>0x03 - Recording analog service<br>0x04 - reserved<br>0x05 - No recording - unable to record digital service<br>0x06 - No recording - unable to record Analogu Service<br>0x07 - No recording - unable to select required service<br>0x08 to 0x0A - reserved<br>0x0B No recording - conditional access system not supported<br>0x0C - No Recording - No or Insufficient conditional access Entitlements<br>0x0D - Not allowed to record<br>0x0E - No more copies allowed<br>0x0F - reserved<br>0x10 - no recording - no media<br>0x11 - no recording playing<br>0x12 - no recording already recording<br>0x13 - no recording - media protected<br>0x14 - no recording - no source<br>0x15 - no recording - media problem<br>0x16 - recording - not enough space available<br>0x17 - No recording Parental Lock On<br>0x18-0x19 - reserved<br>0x1A - Recording terminated normally<br>0x1B - Recording has already terminated<br>0x1C - 0x1E - reserved<br>0x1F - no recording - other problem<br>0x20 to 0xFF - reserved | Recording device to display or Initiator and Follower swapped from <Record On> command | No response |
| <Record Display> | None | N/A | N/A | Source to display | <Record On> or <Action Reject> |

Referring to Table 6, 1 byte is allocated to a record on message requesting that the source device should perform a record function. In case of 0x01, it means that the source device records A/V data. In case of 0x02, it means that the source device records digital broadcast services only. In case of 0x03, it means that the source device records analog broadcast services only. If the device which has received the record on message from the WHDI device can record video materials which are currently displayed, it transmits a record status message as a response message. If the device cannot follow up the record on message, it transmits an action reject message. If the device which has received the record on message is performing non-record activity interrupting recording, such as current video display, it stops a display function in accordance with a priority order unless video materials currently displayed are being already recorded, and performs a record function according to the received message. Substantially, recording of A/V data is determined depending on the status of the tuner device that is a sub device. Also, the record on message may be transmitted from the source device to the tuner device or from the display device to the tuner device of the source device.

The record off message is to request the source device, which is recording A/V data, to stop a record function. At this time, the source device which has received the record off message from the device which has requested the record function stops the record function as soon as it receives the corresponding message. If the source device receives the record off message from another device not the device which has requested the record function, it may not follow the corresponding message.

The tuner device can transmit the record status message to a device that displays A/V data, at any time, to report the status change to the device, wherein the status change occurs when the record function is being performed.

As described above, in order that the source device transmitting A/V data performs a record function, the display device that displays the A/V data needs to remotely control the source device. To this end, information of the tuner device of the source device, which substantially performs the record function, is required. Accordingly, the source device needs status information of the tuner device as described above. This will be described hereinafter with reference to FIG. 32.

Figure 32:
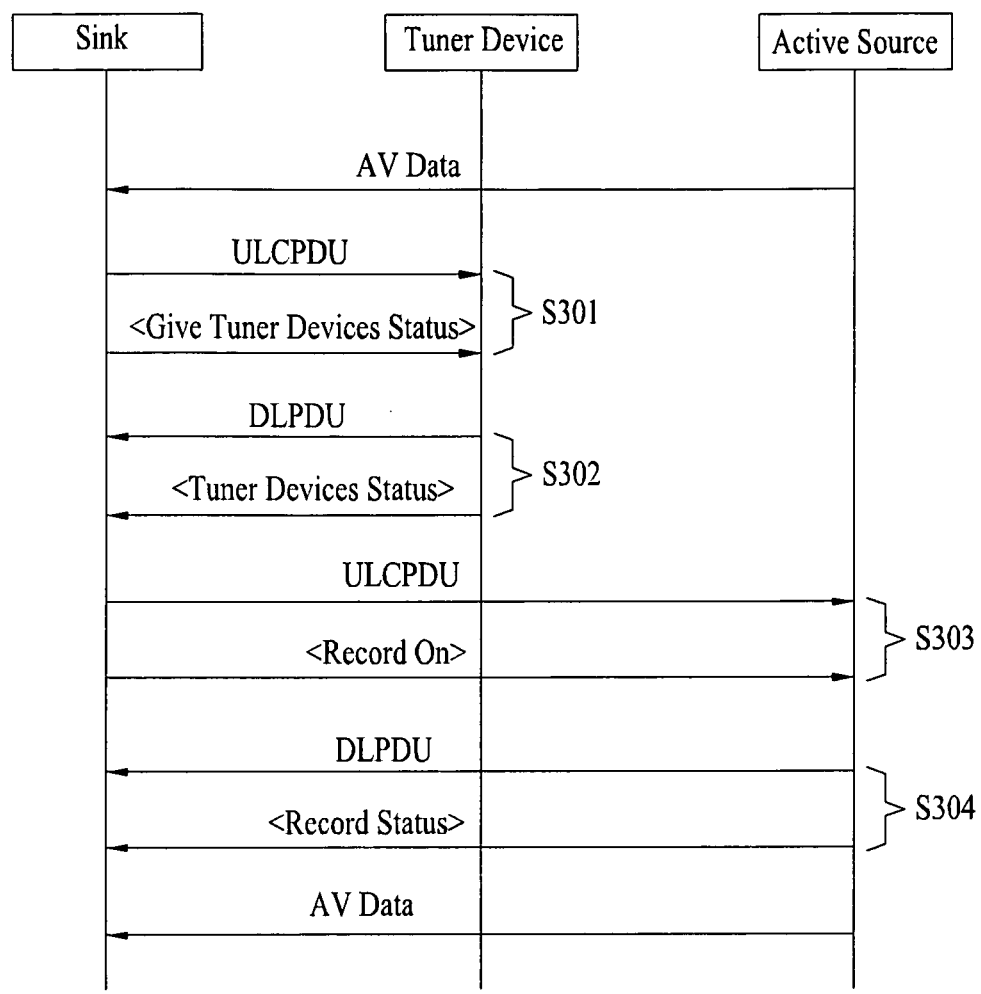
FIG. 32 is a flow chart illustrating an example of a process of exchanging AVCL command between WHDI devices to control a record function in accordance with one embodiment of the present invention.

FIG. 32 is a flow chart illustrating an example of a process of exchanging AVCL command between WHDI devices to control a record function in accordance with one embodiment of the present invention.

In FIG. 32, as an example of a display device that displays A/V data streams, a sink device that receives A/V data streams from a WHDI source device and displays them will be described. In this case, the source device includes an active source device and a passive source device. If the source device includes a tuner device, the sink device can substantially request the source device to provide status information of the tuner device and receive a response message to the request.

Before transmitting AVCL command to the tuner device and the source device, the receiving device transmits the aforementioned 'Test' message and receives the 'Action Accept message'. Therefore, it is assumed that the processor of the corresponding AVCL command is implemented in the tuner device and the transmitting device.

Referring to FIG. 32, the sink device that receives A/V data from the source device performs a search process as to whether the record function is included in functions of the tuner device of the source device and performance of the record function if a record command signal is input from the user. Accordingly, the sink device transmits the Give Tuner Device Status message requesting status information of the tuner device to the source device through the ULCPDU. At this time, since the tuner device is located at the front end of the active source device and corresponds to a radio signal input port, the sink device substantially transmits the Give Tuner Device Status message to the tuner device through the ULCPDU (S301). The tuner device which has received the Give Tuner Device Status message transmits a response message, i.e., Tuner Device Status message, which includes status information of the tuner device, to the sink device through the DLPDU in response to the Give Tuner Device Status message (S302). At this time, unlike FIG. 32, the tuner device may exchange the Give Tuner Device Status message and its response message with the source device.

The response message includes record information indicating whether the tuner device records current A/V data streams, information of the device source, tuner type information indicating whether the tuner device serves analog or digital broadcasting signals, and caption information indicating whether the A/V data include text data (caption) indicating the status of the tuner device.

If the tuner device can currently record A/V data in accordance with the response message, the sink device transmits the record on message to the source device through the ULCPDU, wherein the record on message includes the status information of the tuner device (S303). If the response message includes an unavailable record message, the sink device can search another source device that can perform the record function.

The source device which has received the record on message from the sink device transmits the record status message of the record on message to the sink device through the DLPDU (S304).

Referring to FIG. 2, if the receiving module 201 receives the record on message, the network control module 206 processes the record on message, and the control module 205 determines whether to perform record. The record status message can be generated by the control module 205 or the network control module 206 and then transmitted to sink device.

Unlike FIG. 32, if an external tuner device serves as the source device that transmits A/V data to the sink device, the user can remotely control the external tuner device using a remote controller. For example, the sink device can directly exchange the Give Tuner Device Status message and the response message with the tuner device in accordance with OTR function selection of the user. If the tuner device transmits the response message indicating available record function, the sink device searches a specific source device that has the same tuner performance and can perform the same record function, transmits the record on message to the specific source device, and receives a response message to the record on message. At this time, since the response message, i.e., Tuner Device Status message of the tuner device includes caption information, the user can identify whether the tuner device performs the record function.

In the aforementioned embodiments, the MAC message that includes the record on message transmitted from the sink device to the source device is transmitted by being encapsulated in the ULCPDU. Accordingly, the MAC message is transmitted by being included in the data field of the ULPCDU in the same manner as the Give Tuner Device Status message described in FIG. 30. Also, the MAC message that includes the record status message transmitted from the source device to the sink device is transmitted by being included in the extended header of the DLPDU or the data field in the same manner as he response message described in FIG. 31.

As described above, the user can receive the status information of the tuner device in a type of caption through AVCL message exchange according to one embodiment of the present invention, and thus can request record function setting of the source device.

The terms herein can be replaced with other terms. For example, "device" can be replaced with user device (or machine), station, etc., and "coordinator" can be replaced with coordinating (control) device, coordinating (or control)

station, piconet coordinator, etc. Also, the AVCL command transmitted and received between devices can be used to mean the AVCL message.

Furthermore, although the aforementioned embodiments have been described based on the examples to which technical features of the present invention are applied to WVAN, the technical features of the present invention may be applied to a peer-to-peer communication system or other wireless network system.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

According to the present invention, the signaling process for setting connection between the devices to transmit A/V signals in the wireless network can be simplified.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for controlling recording of an audio/video (A/V) data stream in a display device of a wireless network, the control method comprising:

transmitting a first request message to a tuner device for requesting status information of the tuner device that transmits an A/V data stream to the display device after receiving a recording instruction signal from a user;

receiving a first response message which comprises status information of the tuner device, from the tuner device in response to the first request message;

transmitting a second request message to request recording of the A/V data stream to the source device, the second request message comprising the status information of the tuner device; and receiving a second response message from the source device in response to the second request message, wherein the first response message comprises information indicating whether caption information is included in the A/V data stream transmitted from the tuner device to the display device.

2. The method of claim 1, further comprising:

transmitting a test message to the tuner device for testing whether the tuner device processes the first request message; and receiving a third response message from the tuner device in response to the test message.

3. The method of claim 1, wherein the display device displays a caption included in the caption information by overlaying it on the A/V data, and the caption is text data indicating the status of the tuner device.

4. The method of claim 1, wherein the first response message further comprises information indicating whether the tuner device is performing recording on a specific channel.

5. The method of claim 1, wherein the first request message is transmitted to the tuner device by being encapsulated in a first uplink control PHY data unit (ULCPDU), and wherein the first response message is received in the display device by being encapsulated in a first downlink PHY data unit (DLPDU).

6. The method of claim 5, wherein the first DLPDU comprises a basic header and an extended header, and wherein the first response message is included in the extended header or the first response message is included in the first DLPDU by being multiplexed with A/V signals transmitted from the tuner device.

7. The method of claim 5, wherein the first DLPDU is transmitted for a time period that comprises a first time period for which a MAC message and at least one header are transmitted and a second time period for which the A/V signals are transmitted, and the first ULCPDU is transmitted for the first time period.

8. The method of claim 1, wherein the second request message is transmitted to the source device by being encapsulated in a second ULCPDU, and the second response message is received in the display device by being encapsulated in a second DLPDU.

9. The method of claim 8, wherein the second DLPDU comprising a basic header and an extended header, and the second response message is included in the extended header or the second response message is included in the second DLPDU by being multiplexed with A/V signals transmitted from the source device.

10. The method of claim 8, wherein the second DLPDU is transmitted for a time period that includes a first time period for which a MAC message and at least one header are transmitted and a second time period for which the A/V signals are transmitted, and the second ULCPDU is transmitted for the first time period.

11. A sink device performing control for recording of an audio/video (A/V) data stream in a wireless network, the sink device comprising:
   an audio video control (AVC) layer generating a first command comprising a first identifier identifying the sink device, a second identifier identifying a source device or a tuner device, and an operation code;
   a medium access control (MAC) layer generating a MAC message comprising a message preamble, a message type and the first command transferred from the AVC layer; and
   a physical layer generating a first physical data unit comprising an uplink control header, the MAC message and A/V data and transmitting the first physical data unit to the source device or the tuner device, and receiving a second physical data unit from the source device or the tuner device, the second physical data unit comprising a second command transmitted from the source device or the tuner device in response to the first command,
   wherein the second command comprises information indicating whether caption information is included in an A/V data stream transmitted from the tuner device to a display device.

12. The sink device of claim 11, wherein the first command comprises a first request message for requesting status information of the tuner device, and wherein the second command comprises a first response message indicating the status of the tuner device.

13. The sink device of claim 11, wherein the first command comprises a second request message for requesting recording of the A/V data stream, and wherein the second command comprises a second response message in response to the second request message.

14. The sink device of claim 11, wherein the first physical data unit is an uplink control physical data unit (ULCPDU), and wherein the second physical data unit is a downlink physical data unit (DLPDU).

15. The sink device of claim 11, wherein the first command comprises a test message testing whether the source device or the tuner device processes AVCL command transmitted from the sink device, and wherein the second command comprises a third response message in response to the test message.

16. The sink device of claim 14, wherein the DLPDU is transmitted for a time period comprising a first time period for which the MAC message and at least one header are transmitted and a second time period for which the A/V data are transmitted, and wherein the ULCPDU is transmitted for the first time period for which a part of the DLPDU should be transmitted.

17. The sink device of claim 14, wherein the second command is multiplexed with the A/V signals transmitted from the tuner device or the source device and then included in the DLPDU.

18. The sink device of claim 14, wherein the DLPDU includes a basic header and an extended header, and wherein the second command is included in the extended header.

19. A source device of a wireless network, the source device comprising:
   a receiving module receiving a broadcasting signal and a first command from a sink device, the first command for identifying whether the source device can record audio/video (A/V) data;
   a network control module processing the first command and generating a physical data unit comprising a MAC message and the broadcasting signal, the MAC message comprising a second command in response to the first command, and transmitting the generated physical data unit to the sink device; and
   a control module determining whether to perform control recording of an A/V data stream according to the first command processed by the network control module,
   wherein the control module determines whether to record the A/V data stream depending on the status of a tuner device.

20. A method of exchanging messages in a tuner device receiving a first command from a display device of a wireless network, the method comprising:
   generating a second command comprising information indicating the status of the tuner device in response to the first command in an AVC layer;
   transferring a MAC message from a MAC layer to a physical layer, the MAC message comprising a message preamble, a message type and the second command transmitted from the AVC layer; and
   transmitting a downlink physical (PHY) layer data unit from the physical layer to the display device, the physical data unit comprising at least one header, the MAC message, and the A/V data,
   wherein the second command comprises information indicating whether caption information is included in an A/V data stream transmitted from the tuner device to the display device.

21. The method of claim 20, further comprising generating a response message to a test message for testing whether the AVC layer processes a specific AVCL command transmitted from the sink device.

22. The method of claim 20, wherein a caption included in the caption information is text data indicating the status of the tuner device.

23. The method of claim 20, wherein the second command further comprises information indicating whether the tuner device is performing recording on a specific channel.

24. A tuner device in a wireless network, the tuner device comprising:
   an AVC layer generating an AVCL message comprising a first identifier identifying the tuner device, a second identifier identifying a display device, a second command comprising an operation code, and information of the tuner device, wherein the AVCL message is a response message for a first command received from the display device;
   a MAC layer generating a MAC message comprising a message preamble, a message type and the second command transferred from the AVC layer; and
   a physical layer receiving a first physical data unit comprising the first command, and generating a second physical data unit comprising an uplink control header, the MAC message and Audio/Video (A/V) data and transmitting the second physical data unit to the display device,
   wherein the information of the tuner device comprises information indicating whether caption information is included in an A/V data stream transmitted from the tuner device to the display device.

25. The tuner device of claim 24, wherein a caption included in the caption information is text data indicating the status of the tuner device.

26. The tuner device of claim 24, wherein the first physical data unit is an uplink control physical data unit (ULCPDU), and wherein the second physical data unit is a downlink physical data unit (DLPDU).

27. The tuner device of claim 26, wherein the DLPDU includes a basic header and an extended header, and the second command is included in the extended header or the second command is included in the DLPDU by being multiplexed with A/V signals transmitted from the tuner device.

28. The tuner device of claim 26, wherein the DLPDU is transmitted for a time period comprising a first time period for which the MAC message and at least one header are transmitted and a second time period for which the A/V signals are transmitted, and wherein the ULCPDU is transmitted for the first time period.

* * * * *